US009679255B1

(12) United States Patent
Mullaly et al.

(10) Patent No.: US 9,679,255 B1
(45) Date of Patent: Jun. 13, 2017

(54) EVENT CONDITION DETECTION

(71) Applicant: oneEvent Technologies, Inc., Mount Horeb, WI (US)

(72) Inventors: Paul Robert Mullaly, Santa Monica, CA (US); Kurt Joseph Wedig, Mount Horeb, WI (US); Daniel Ralph Parent, Mount Horeb, WI (US); Kevin Sadowski, Mount Horeb, WI (US); Scott Todd Smith, Oregon, WI (US); Nathan Gabriel, Fitchburg, WI (US); Laura Nagler, McFarland, WI (US)

(73) Assignee: ONEEVENT TECHNOLOGIES, INC., Mount Horeb, WI (US)

(*) Notice: Subject to any disclaimer, the term of this patent is extended or adjusted under 35 U.S.C. 154(b) by 0 days.

(21) Appl. No.: 15/099,786

(22) Filed: Apr. 15, 2016

Related U.S. Application Data

(63) Continuation of application No. 15/097,909, filed on Apr. 13, 2016, now abandoned.

(51) Int. Cl.
*G06N 99/00* (2010.01)
*G06N 7/00* (2006.01)
*G08B 17/10* (2006.01)
*G08B 29/26* (2006.01)
*G08B 29/18* (2006.01)

(52) U.S. Cl.
CPC ............. *G06N 7/005* (2013.01); *G06N 99/00* (2013.01); *G08B 17/10* (2013.01); *G08B 29/186* (2013.01); *G08B 29/26* (2013.01)

(58) Field of Classification Search
CPC ...................................................... G06N 99/00
See application file for complete search history.

(56) References Cited

U.S. PATENT DOCUMENTS

| | | | | |
|---|---|---|---|---|
| 2005/0200475 | A1* | 9/2005 | Chen ...................... | G08B 17/10 340/521 |
| 2011/0240798 | A1* | 10/2011 | Gershzohn ............. | G08B 17/00 244/129.2 |
| 2016/0117070 | A1* | 4/2016 | Rose .................... | G06F 3/04817 715/738 |

OTHER PUBLICATIONS

R. Berger and T. Hart, Statistical Process Control: A Guide for Implementation, Quality and Reliability vol. 8, The American Society for Quality Control, p. 9.*

(Continued)

*Primary Examiner* — Vincent Gonzales
(74) *Attorney, Agent, or Firm* — Foley & Lardner LLP

(57) ABSTRACT

A method includes receiving data from a sensor over time. The data comprises a plurality of values that are each indicative of a sensed condition at a unique time. The method also includes determining a real-time value, a mid-term moving average, and a long-term moving average based on the data and determining a most-recent combined average by averaging the real-time value, the mid-term moving average, and the long-term moving average. The method further includes determining an upper setpoint by adding an offset value to the most-recent combined average and determining a lower setpoint by subtracting the offset value to the most-recent combined average. The method also includes transmitting an alert based on a determination that a most recent value of the data is either greater than the upper setpoint or lower than the lower setpoint.

18 Claims, 21 Drawing Sheets

(56) References Cited

OTHER PUBLICATIONS

V. Bryan et al., "Empirical Study Using Alternative Early Warning Systems to Address Fire in Homes of Deaf or Hard of Hearing Individuals", Handbook of Research on Education and Technology in a Changing Society, 2014, pp. 367-386.*

* cited by examiner

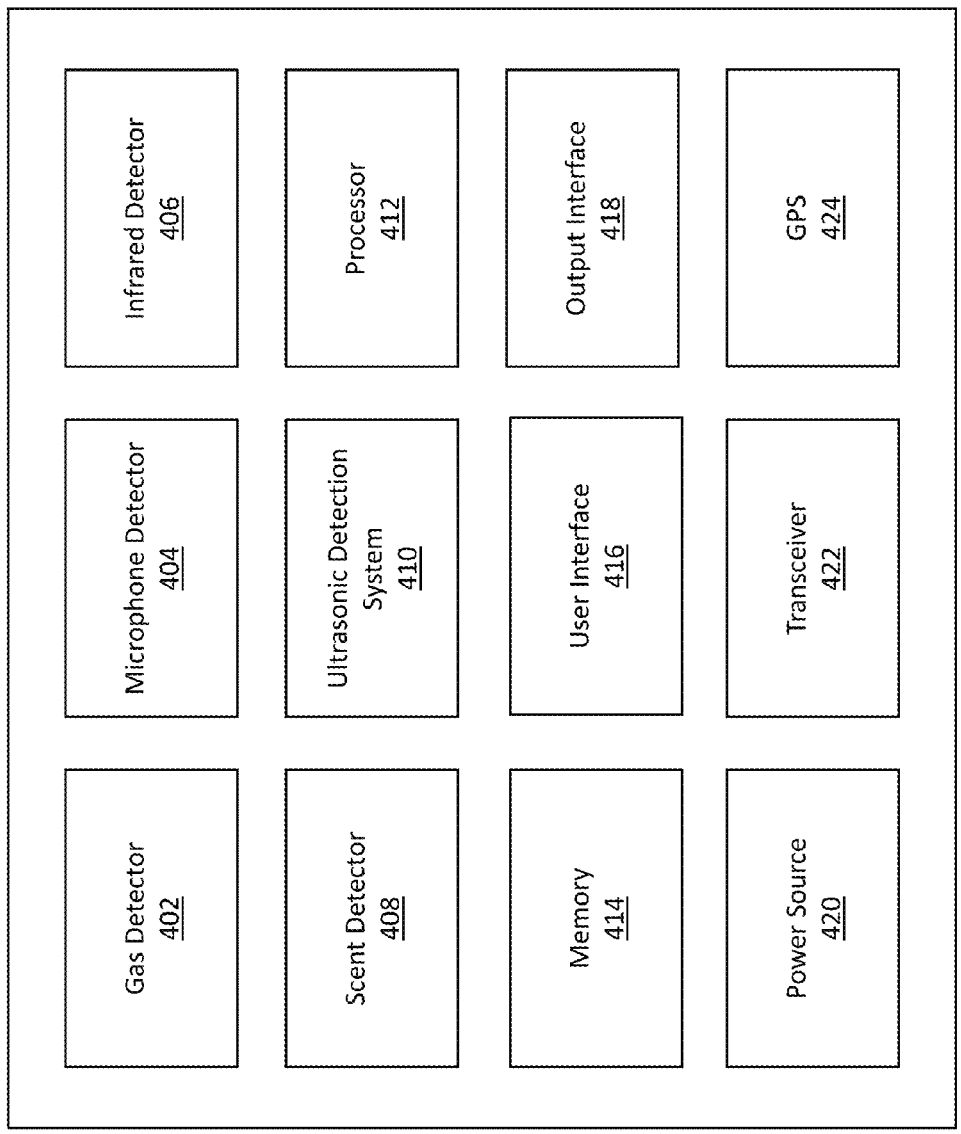

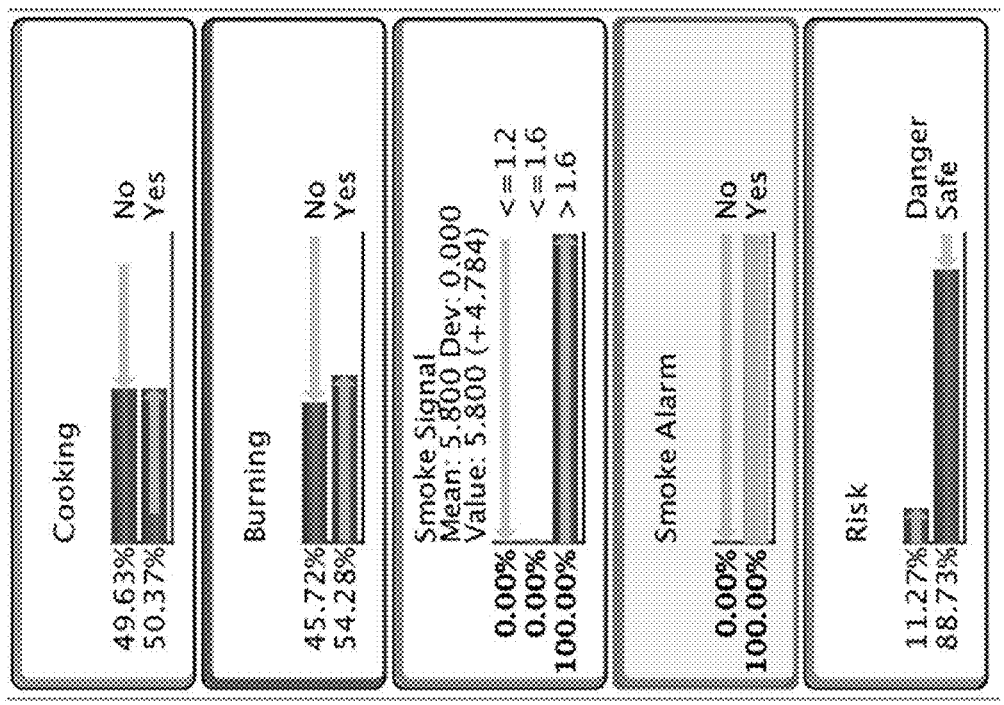
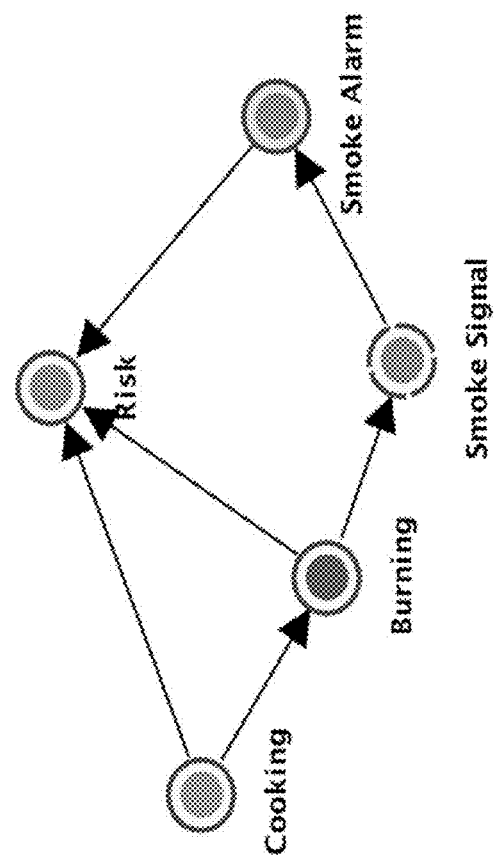
Fig. 9

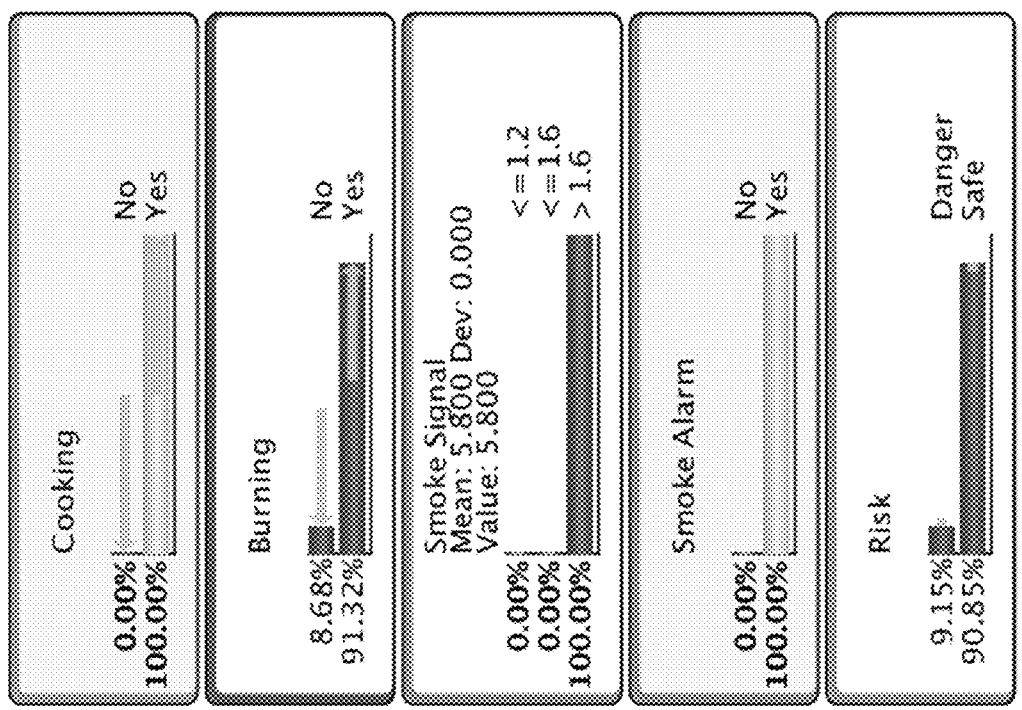
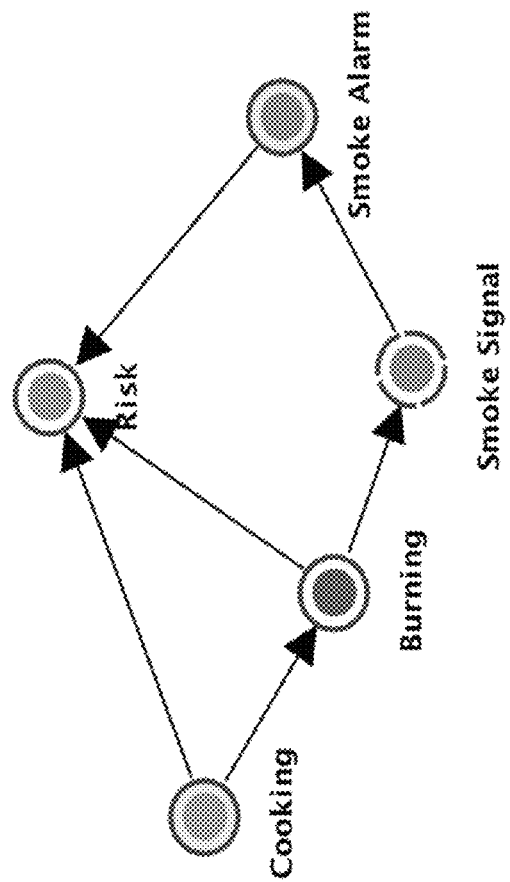
Fig. 10

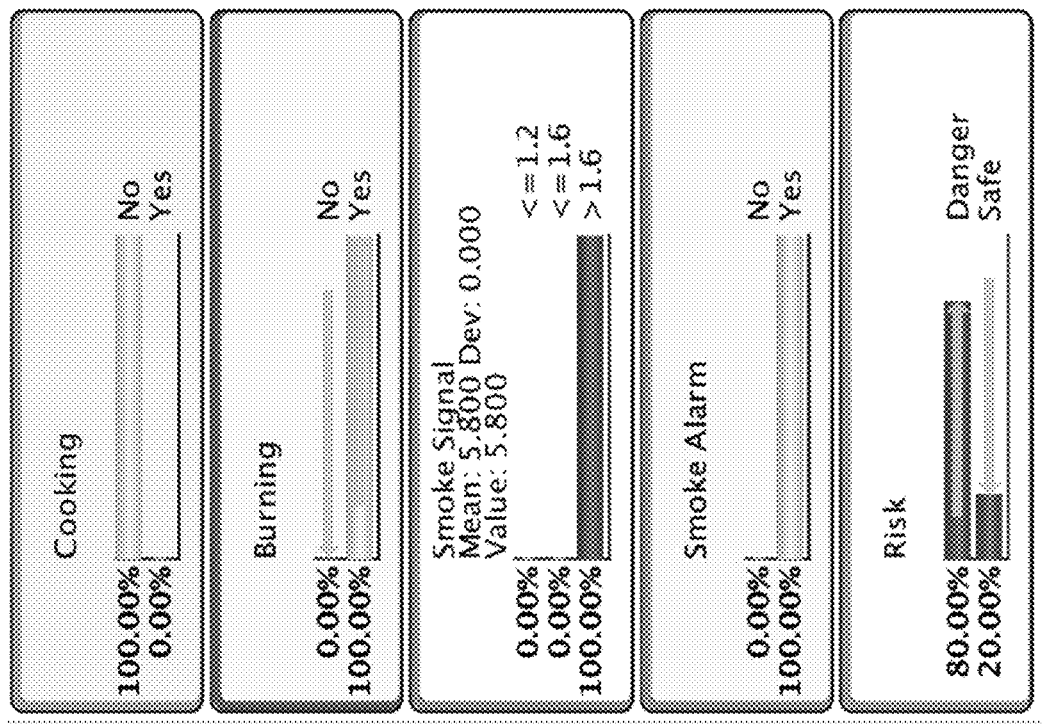
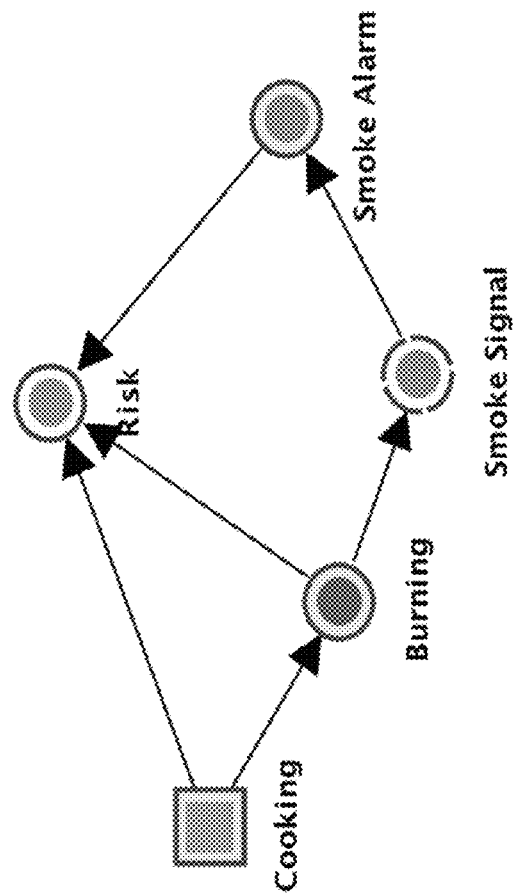
Fig. 11

| Smoke Alarm | Burning | Cooking | Motion | Risk | |
|---|---|---|---|---|---|
| | | | | Danger | Safe |
| No | No | No | No | 0.01% | 99.99% |
| No | No | No | Yes | 0.001% | 99.999% |
| No | No | Yes | No | 1% | 99% |
| No | No | Yes | Yes | 1% | 99% |
| No | Yes | No | No | 50% | 50% |
| No | Yes | No | Yes | 5% | 95% |
| No | Yes | Yes | No | 5% | 95% |
| No | Yes | Yes | Yes | 5% | 95% |
| Yes | No | No | No | 0.1% | 99.9% |
| Yes | No | No | Yes | 0.1% | 99.9% |
| Yes | No | Yes | No | 0.2% | 99.8% |
| Yes | No | Yes | Yes | 0.2% | 99.8% |
| Yes | Yes | No | No | 95% | 5% |
| Yes | Yes | No | Yes | 50% | 50% |
| Yes | Yes | Yes | No | 10% | 90% |
| Yes | Yes | Yes | Yes | 10% | 90% |

Fig. 12B

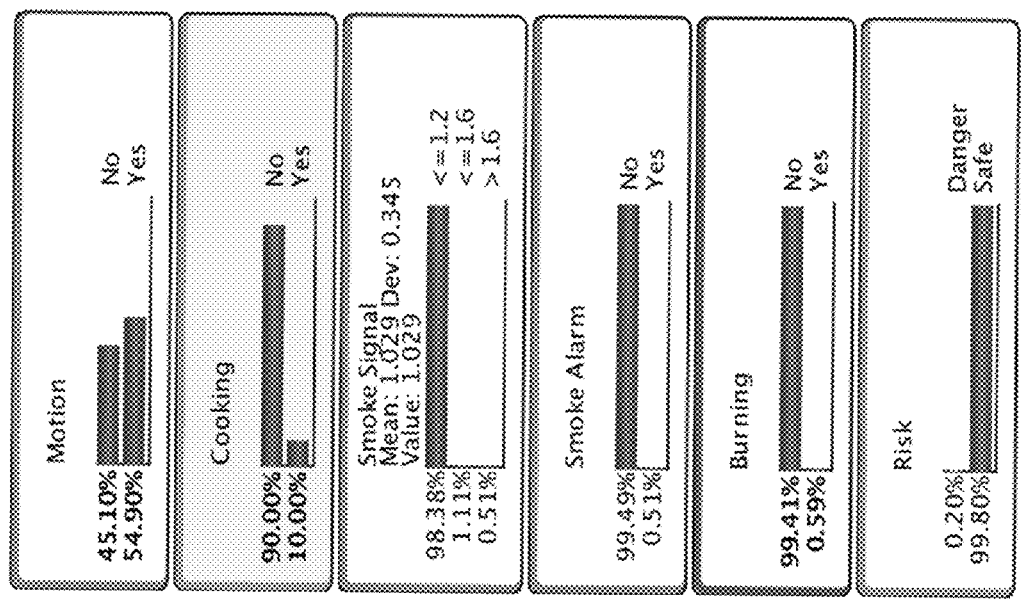
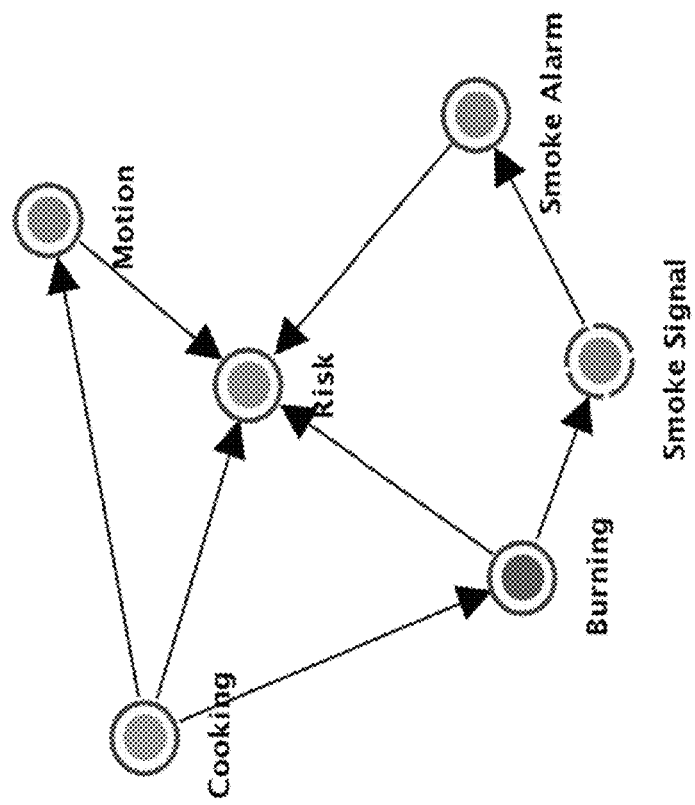
Fig. 13

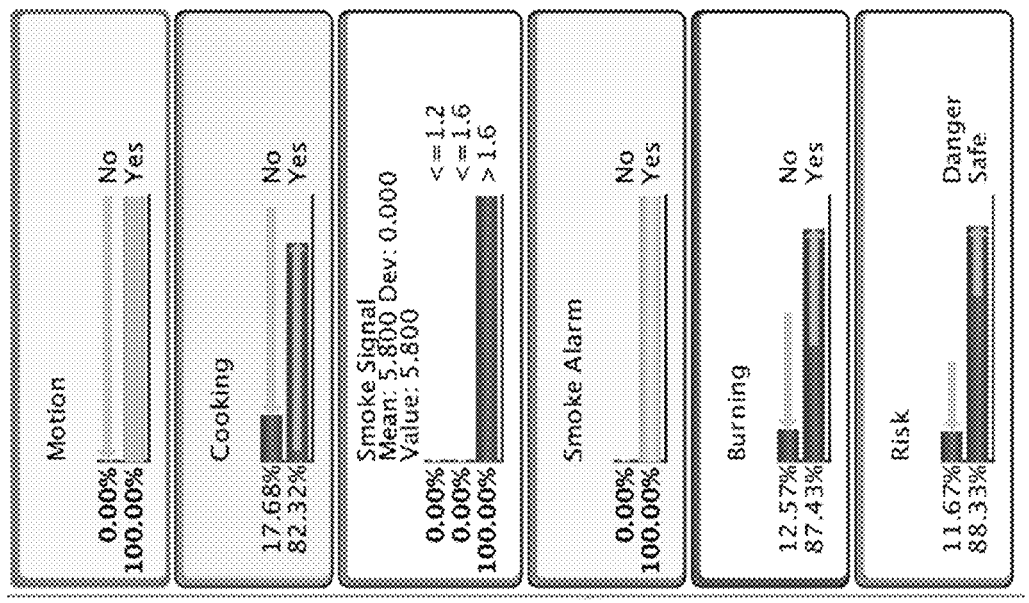
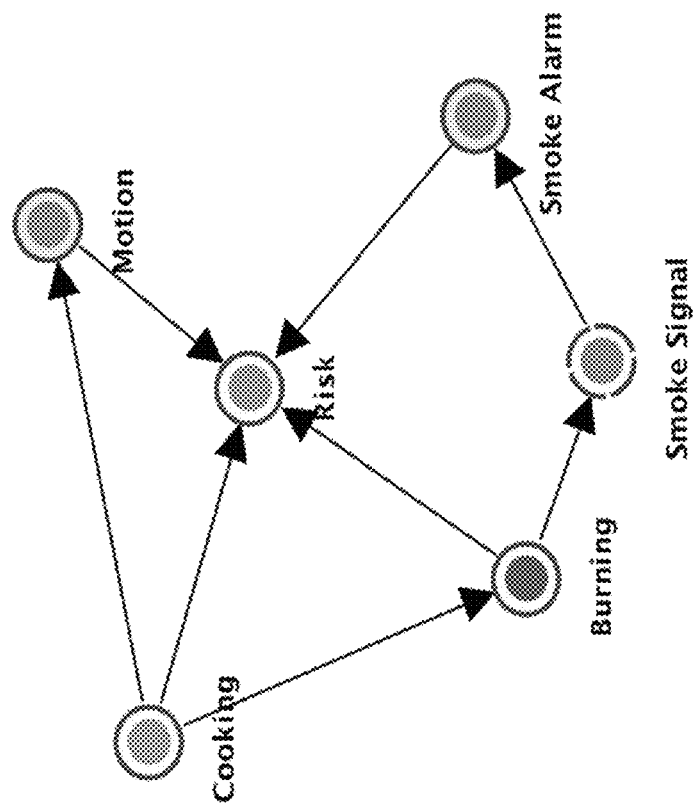
Fig. 14

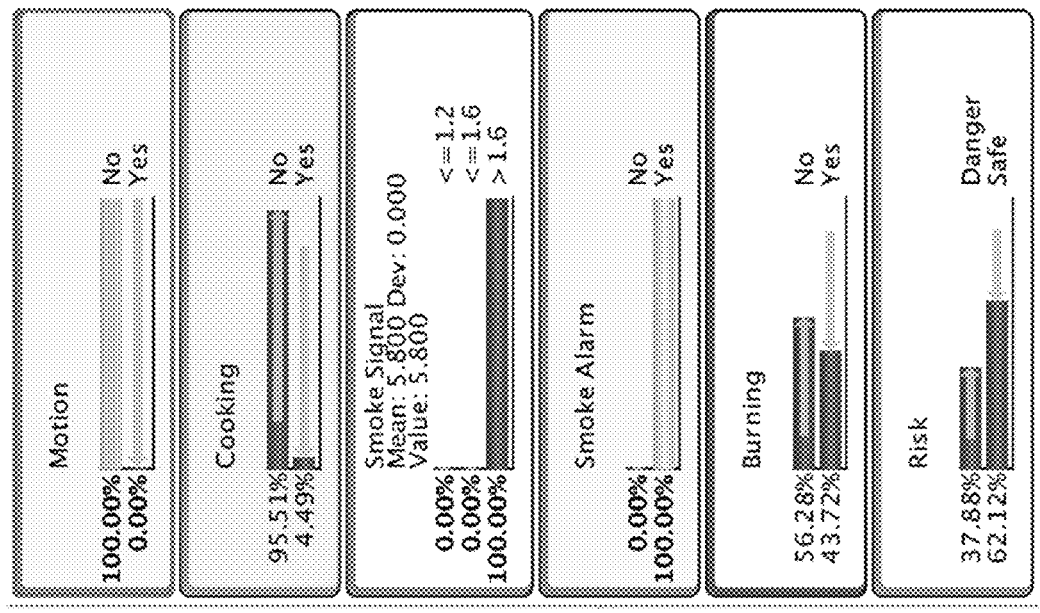
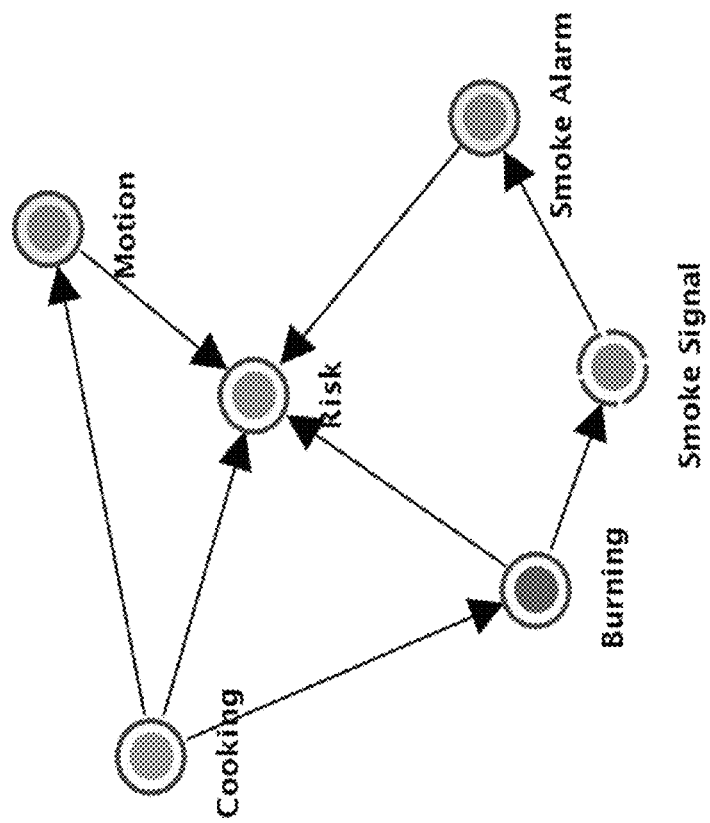
Fig. 15

EVENT CONDITION DETECTION

CROSS REFERENCE TO RELATED APPLICATIONS

The present application is a continuation of U.S. patent application Ser. No. 15/097,909, filed Apr. 13, 2016, which is hereby incorporated by reference in its entirety. The present application is also related to U.S. Application No. 62/170,530 filed Jun. 3, 2015; U.S. application Ser. No. 14/633,949 filed Feb. 27, 2015; U.S. application Ser. No. 14/940,969 Nov. 13, 2015; U.S. application Ser. No. 12/389,665 filed Feb. 20, 2009; and U.S. application Ser. No. 14/587,358 filed Dec. 31, 2014, which are each incorporated herein by reference in their entirety.

BACKGROUND

The following description is provided to assist the understanding of the reader. None of the information provided or references cited is admitted to be prior art. Systems can be used to monitor one or more conditions. For example, a thermal sensor can be used to measure the temperature of a room. Such systems can have an upper limit and a lower limit that, if the sensed temperature is above the upper limit or below the lower limit, can be used to set off an alarm. However, what is considered acceptable to occupants of the room may change over time.

SUMMARY

An illustrative method includes receiving data from a sensor over time. The data comprises a plurality of values that are each indicative of a sensed condition at a unique time. The method also includes determining a real-time value, a mid-term moving average, and a long-term moving average based on the data and determining a most-recent combined average by averaging the real-time value, the mid-term moving average, and the long-term moving average. The method further includes determining an upper setpoint by adding an offset value to the most-recent combined average and determining a lower setpoint by subtracting the offset value to the most-recent combined average. The method also includes transmitting an alert based on a determination that a most recent value of the data is either greater than the upper setpoint or lower than the lower setpoint.

An illustrative device includes a memory configured to store data received from a sensor over time and a processor. The data comprises a plurality of values that are each indicative of a sensed condition at a unique time. The processor is operatively coupled to the memory. The device is configured to determine a real-time value, a mid-term moving average, and a long-term moving average based on the data and determine a most-recent combined average by averaging the real-time value, the mid-term moving average, and the long-term moving average. The processor is further configured to determine an upper setpoint by adding an offset value to the most-recent combined average and determine a lower setpoint by subtracting the offset value to the most-recent combined average. The method is also configured to transmit an alert based on a determination that a most recent value of the data is either greater than the upper setpoint or lower than the lower setpoint.

An illustrative non-transitory computer-readable medium has computer-readable instructions stored thereon that, upon execution by a processor, cause a device to perform operations. The instructions comprise instructions to receive data from a sensor over time. The data comprises a plurality of values that are each indicative of a sensed condition at a unique time. The instructions include instructions to determine a real-time value, a mid-term moving average, and a long-term moving average based on the data and instructions to determine a most-recent combined average by averaging the real-time value, the mid-term moving average, and the long-term moving average. The instructions also include instructions to determine an upper setpoint by adding an offset value to the most-recent combined average and instructions to determine a lower setpoint by subtracting the offset value to the most-recent combined average. The instructions further include instructions to transmit an alert based on a determination that a most recent value of the data is either greater than the upper setpoint or lower than the lower setpoint.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

Illustrative embodiments will hereafter be described with reference to the accompanying drawings.

FIG. 4 is a block diagram illustrating a portable occupancy unit in accordance with an illustrative embodiment.

FIGS. 9-11 are Bayesian Network diagrams and corresponding risks based on known information in accordance with illustrative embodiments.

FIGS. 12A and 12B are a Bayesian Network diagram for determining a risk in accordance with an illustrative embodiment.

FIGS. 13-15 are Bayesian Network diagrams and corresponding risks based on known information in accordance with illustrative embodiments.

Figure 1:
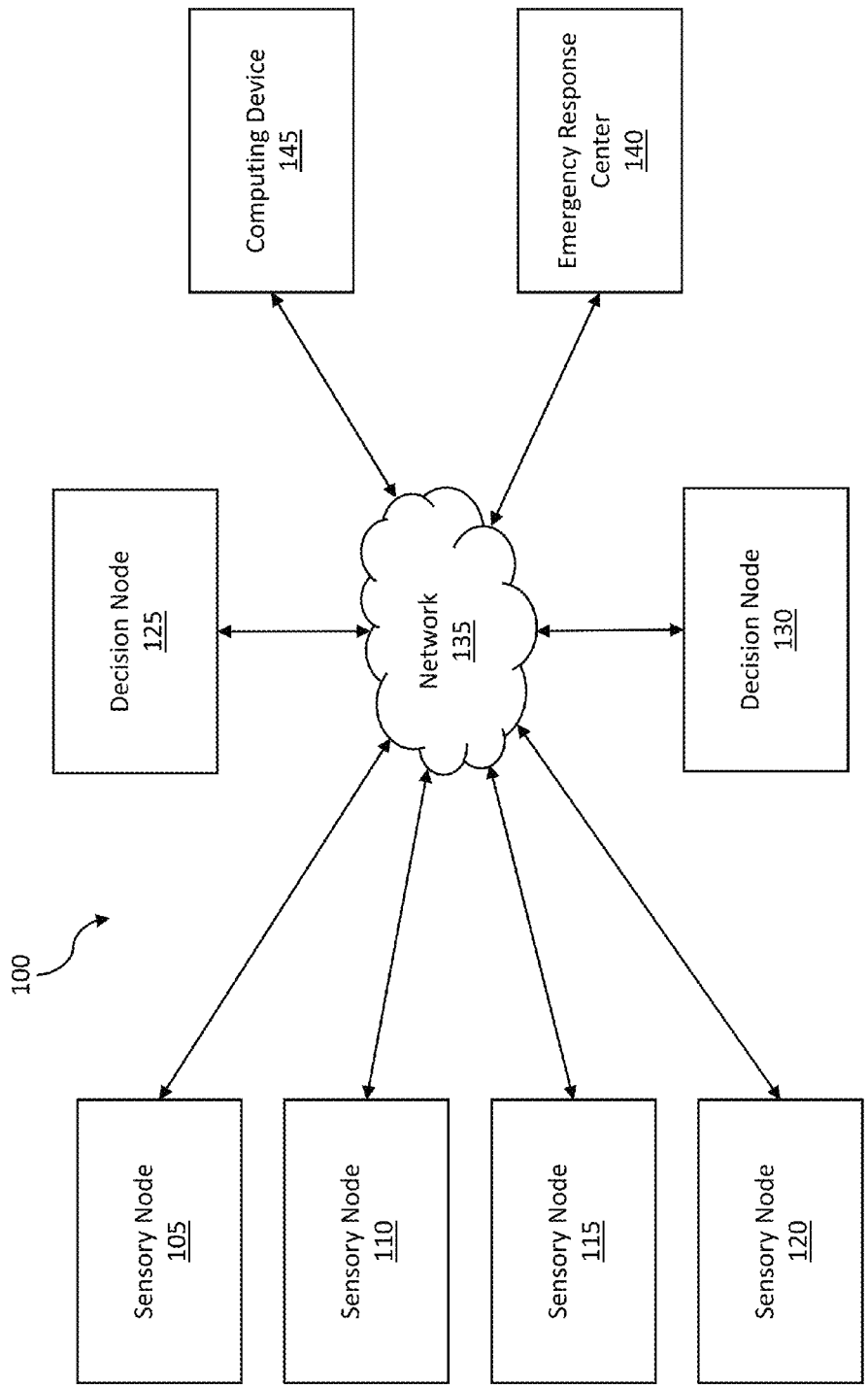
FIG. 1 is a block diagram illustrating a response system in accordance with an illustrative embodiment.

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

FIG. 1 is a block diagram of a response system 100 in accordance with an illustrative embodiment. In alternative embodiments, response system 100 may include additional, fewer, and/or different components. Response system 100 includes a sensory node 105, a sensory node 110, a sensory node 115, and a sensory node 120. In alternative embodiments, additional or fewer sensory nodes may be included. Response system 100 also includes a decision node 125 and a decision node 130. Alternatively, additional or fewer decision nodes may be included.

In an illustrative embodiment, sensory nodes 105, 110, 115, and 120 can be configured to detect an evacuation condition. The evacuation condition can be a fire, which may be detected by the presence of smoke and/or excessive heat. The evacuation condition may also be an unacceptable level of a toxic gas such as carbon monoxide, nitrogen dioxide, etc. Sensory nodes 105, 110, 115, and 120 can be distributed throughout a structure. The structure can be a home, an office building, a commercial space, a store, a factory, or any other building or structure. As an example, a single story office building can have one or more sensory nodes in each office, each bathroom, each common area, etc. An illustrative sensory node is described in more detail with reference to FIG. 2.

Sensory nodes 105, 110, 115, and 120 can also be configured to detect and/or monitor occupancy such that response system 100 can determine one or more optimal evacuation routes. For example, sensory node 105 may be placed in a conference room of a hotel. Using occupancy detection, sensory node 105 can know that there are approximately 80 individuals in the conference room at the time of an evacuation condition. Response system 100 can use this occupancy information (i.e., the number of individuals and/or the location of the individuals) to determine the evacuation route(s). For example, response system 100 may attempt to determine at least two safe evacuation routes from the conference room to avoid congestion that may occur if only a single evacuation route is designated. Occupancy detection and monitoring are described in more detail with reference to FIG. 2.

Decision nodes 125 and 130 can be configured to determine one or more evacuation routes upon detection of an evacuation condition. Decision nodes 125 and 130 can determine the one or more evacuation routes based on occupancy information such as a present occupancy or an occupancy pattern of a given area, the type of evacuation condition, the magnitude of the evacuation condition, the location(s) at which the evacuation condition is detected, the layout of the structure, etc. The occupancy pattern can be learned over time as the nodes monitor areas during quiescent conditions. Upon determination of the one or more evacuation routes, decision nodes 125 and 130 and/or sensory nodes 105, 110, 115, and 120 can convey the evacuation route(s) to the individuals in the structure. In an illustrative embodiment, the evacuation route(s) can be conveyed as audible voice evacuation messages through speakers of decision nodes 125 and 130 and/or sensory nodes 105, 110, 115, and 120. Alternatively, the evacuation route(s) can be conveyed by any other method. An illustrative decision node is described in more detail with reference to FIG. 3.

Sensory nodes 105, 110, 115, and 120 can communicate with decision nodes 125 and 130 through a network 135. Network 135 can include a short-range communication network such as a Bluetooth network, a Zigbee network, etc. Network 135 can also include a local area network (LAN), a wide area network (WAN), a telecommunications network, the Internet, a public switched telephone network (PSTN), and/or any other type of communication network known to those of skill in the art. Network 135 can be a distributed intelligent network such that response system 100 can make decisions based on sensory input from any nodes in the population of nodes. In an illustrative embodiment, decision nodes 125 and 130 can communicate with sensory nodes 105, 110, 115, and 120 through a short-range communication network. Decision nodes 125 and 130 can also communicate with an emergency response center 140 through a telecommunications network, the Internet, a PSTN, etc. As such, in the event of an evacuation condition, emergency response center 140 can be automatically notified. Emergency response center 140 can be a 911 call center, a fire department, a police department, etc.

In an illustrative embodiment, each of sensory nodes 105, 110, 115, and 120 and/or each of decision nodes 125 and 130 can know its location. The location can be global positioning system (GPS) coordinates. In one embodiment, a computing device 145 can be used to upload the location to sensory nodes 105, 110, 115, and 120 and/or decision nodes 125 and 130. Computing device 145 can be a portable GPS system, a cellular device, a laptop computer, or any other type of communication device configured to convey the location. As an example, computing device 145 can be a GPS-enabled laptop computer. During setup and installation of response system 100, a technician can place the GPS-enabled laptop computer proximate to sensory node 105. The GPS-enabled laptop computer can determine its current GPS coordinates, and the GPS coordinates can be uploaded to sensory node 105. The GPS coordinates can be uploaded to sensory node 105 wirelessly through network 135 or through a wired connection. Alternatively, the GPS coordinates can be manually entered through a user interface of sensory node 105. The GPS coordinates can similarly be uploaded to sensory nodes 110, 115, and 120 and decision nodes 125 and 130. In one embodiment, sensory nodes 105, 110, 115, and 120 and/or decision nodes 125 and 130 may be GPS-enabled for determining their respective locations. In one embodiment, each node can have a unique identification number or tag, which may be programmed during the manufacturing of the node. The identification can be used to match the GPS coordinates to the node during installation. Computing device 145 can use the identification information to obtain a one-to-one connection with the node to correctly program the GPS coordinates over network 135. In an alternative embodiment, GPS coordinates may not be used, and the location can be in terms of position with a particular structure. For example, sensory node 105 may be located in room five on the third floor of a hotel, and this information can be the location information for sensory node 105. Regardless of how the locations are represented, response system 100 can determine the evacuation route(s) based at least in part on the locations and a known layout of the structure.

Figure 2:
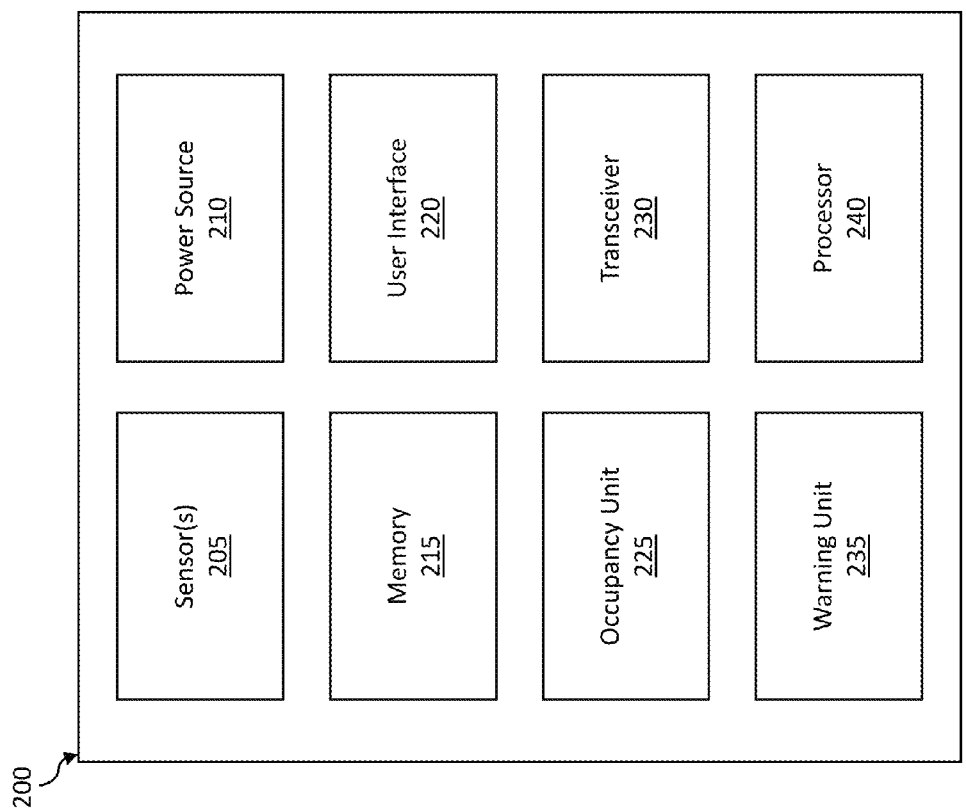
FIG. 2 is a block diagram illustrating a sensory node in accordance with an illustrative embodiment.

FIG. 2 is a block diagram illustrating a sensory node 200 in accordance with an illustrative embodiment. In alternative embodiments, sensory node 200 may include additional, fewer, and/or different components. Sensory node 200 includes sensor(s) 205, a power source 210, a memory 215, a user interface 220, an occupancy unit 225, a transceiver 230, a warning unit 235, and a processor 240. Sensor(s) 205 can include a smoke detector, a heat sensor, a carbon monoxide sensor, a nitrogen dioxide sensor, and/or any other type of hazardous condition sensor known to those of skill in the art. In an illustrative embodiment, power source 210 can be a battery. Sensory node 200 can also be hard-wired to the structure such that power is received from the power supply of the structure (i.e., utility grid, generator, solar cell, fuel cell, etc.). In such an embodiment, power source 210 can also include a battery for backup during power outages.

Memory 215 can be configured to store identification information corresponding to sensory node 200. The identification information can be any indication through which other sensory nodes and decision nodes are able to identify sensory node 200. Memory 215 can also be used to store location information corresponding to sensory node 200. The location information can include global positioning system (GPS) coordinates, position within a structure, or any other information which can be used by other sensory nodes and/or decision nodes to determine the location of sensory node 200. In one embodiment, the location information may be used as the identification information. The location information can be received from computing device 145 described with reference to FIG. 1, or from any other source. Memory 215 can further be used to store routing information for a mesh network in which sensory node 200 is located such that sensory node 200 is able to forward information to appropriate nodes during normal operation and in the event of one or more malfunctioning nodes. Memory 215 can also be used to store occupancy information and/or one or more evacuation messages to be conveyed in the event of an evacuation condition. Memory 215 can further be used for storing adaptive occupancy pattern recognition algorithms and for storing compiled occupancy patterns.

User interface 220 can be used by a system administrator or other user to program and/or test sensory node 200. User interface 220 can include one or more controls, a liquid crystal display (LCD) or other display for conveying information, one or more speakers for conveying information, etc. In one embodiment, a user can utilize user interface 220 to record an evacuation message to be played back in the event of an evacuation condition. As an example, sensory node 200 can be located in a bedroom of a small child. A parent of the child can record an evacuation message for the child in a calm, soothing voice such that the child does not panic in the event of an evacuation condition. An example evacuation message can be "wake up Kristin, there is a fire, go out the back door and meet us in the back yard as we have practiced." Different evacuation messages may be recorded for different evacuation conditions. Different evacuation messages may also be recorded based on factors such as the location at which the evacuation condition is detected. As an example, if a fire is detected by any of sensory nodes one through six, a first pre-recorded evacuation message can be played (i.e., exit through the back door), and if the fire is detected at any of nodes seven through twelve, a second pre-recorded evacuation message can be played (i.e., exit through the front door). User interface 220 can also be used to upload location information to sensory node 200, to test sensory node 200 to ensure that sensory node 200 is functional, to adjust a volume level of sensory node 200, to silence sensory node 200, etc. User interface 220 can also be used to alert a user of a problem with sensory node 200 such as low battery power or a malfunction. In one embodiment, user interface 220 can be used to record a personalized message in the event of low battery power, battery malfunction, or other problem. For example, if the device is located within a home structure, the pre-recorded message may indicate that "the evacuation detector in the hallway has low battery power, please change." User interface 220 can further include a button such that a user can report an evacuation condition and activate the response system. User interface 220 can be, for example, an application on a smart phone.

Occupancy unit 225 can be used to detect and/or monitor occupancy of a structure. As an example, occupancy unit 225 can detect whether one or more individuals are in a given room or area of a structure. A decision node can use this occupancy information to determine an appropriate evacuation route or routes. As an example, if it is known that two individuals are in a given room, a single evacuation route can be used. However, if three hundred individuals are in the room, multiple evacuation routes may be provided to prevent congestion. Occupancy unit 225 can also be used to monitor occupancy patterns. As an example, occupancy unit 225 can determine that there are generally numerous individuals in a given room or location between the hours of 8:00 am and 6:00 pm on Mondays through Fridays, and that there are few or no individuals present at other times. A decision node can use this information to determine appropriate evacuation route(s). Information determined by occupancy unit 225 can also be used to help emergency responders in responding to the evacuation condition. For example, it may be known that one individual is in a given room of the structure. The emergency responders can use this occupancy information to focus their efforts on getting the individual out of the room. The occupancy information can be provided to an emergency response center along with a location and type of the evacuation condition. Occupancy unit 225 can also be used to help sort rescue priorities based at least in part on the occupancy information while emergency responders are on route to the structure.

Occupancy unit 225 can detect/monitor the occupancy using one or more motion detectors to detect movement. Occupancy unit 225 can also use a video or still camera and video/image analysis to determine the occupancy. Occupancy unit 225 can also use respiration detection by detecting carbon dioxide gas emitted as a result of breathing. An example high sensitivity carbon dioxide detector for use in respiration detection can be the MG-811 $CO_2$ sensor manufactured by Henan Hanwei Electronics Co., Ltd. based in Zhengzhou, China. Alternatively, any other high sensitivity carbon dioxide sensor may be used. Occupancy unit 225 can also be configured to detect methane, or any other gas which may be associated with human presence.

Occupancy unit 225 can also use infrared sensors to detect heat emitted by individuals. In one embodiment, a plurality of infrared sensors can be used to provide multidirectional monitoring. Alternatively, a single infrared sensor can be used to scan an entire area. The infrared sensor(s) can be combined with a thermal imaging unit to identify thermal patterns and to determine whether detected occupants are human, feline, canine, rodent, etc. The infrared sensors can also be used to determine if occupants are moving or still, to track the direction of occupant traffic, to track the speed of occupant traffic, to track the volume of occupant traffic, etc. This information can be used to alert emergency responders to a panic situation, or to a large captive body of individuals. Activities occurring prior to an evacuation condition can be sensed by the infrared sensors and recorded by the response system. As such, suspicious behavioral movements occurring prior to an evacuation condition can be sensed and recorded. For example, if the evacuation condition was maliciously caused, the recorded information from the infrared sensors can be used to determine how quickly the area was vacated immediately prior to the evacuation condition. Infrared sensor based occupancy detection is described in more detail in an article titled "Development of Infrared Human Sensor" in the Matsushita Electric Works (MEW) Sustainability Report 2004, the entire disclosure of which is incorporated herein by reference.

Occupancy unit 225 can also use audio detection to identify noises associated with occupants such as snoring, respiration, heartbeat, voices, etc. The audio detection can be implemented using a high sensitivity microphone which is capable of detecting a heartbeat, respiration, etc. from across a room. Any high sensitivity microphone known to those of skill in the art may be used. Upon detection of a sound, occupancy unit 225 can utilize pattern recognition to identify the sound as speech, a heartbeat, respiration, snoring, etc. Occupancy unit 225 can similarly utilize voice recognition and/or pitch tone recognition to distinguish human and non-human occupants and/or to distinguish between different human occupants. As such, emergency responders can be informed whether an occupant is a baby, a small child, an adult, a dog, etc. Occupancy unit 225 can also detect occupants using scent detection. An example sensor for detecting scent is described in an article by Jacqueline Mitchell titled "Picking Up the Scent" and appearing in the August 2008 Tufts Journal, the entire disclosure of which is incorporated herein by reference.

In an alternative embodiment, sensory node 200 (and/or decision node 300 described with reference to FIG. 3) can be configured to broadcast occupancy information. In such an embodiment, emergency response personnel can be equipped with a portable receiver configured to receive the broadcasted occupancy information such that the responder knows where any humans are located with the structure. The occupancy information can also be broadcast to any other type of receiver. The occupancy information can be used to help rescue individuals in the event of a fire or other evacuation condition. The occupancy information can also be used in the event of a kidnapping or hostage situation to identify the number of victims involved, the number of perpetrators involved, the locations of the victims and/or perpetrators, etc.

Transceiver 230 can include a transmitter for transmitting information and/or a receiver for receiving information. As an example, transceiver 230 of sensory node 200 can receive status information, occupancy information, evacuation condition information, etc. from a first sensory node and forward the information to a second sensory node or to a decision node. Transceiver 230 can also be used to transmit information corresponding to sensory node 200 to another sensory node or a decision node. For example, transceiver 230 can periodically transmit occupancy information to a decision node such that the decision node has the occupancy information in the event of an evacuation condition. Alternatively, transceiver 230 can be used to transmit the occupancy information to the decision node along with an indication of the evacuation condition. Transceiver 230 can also be used to receive instructions regarding appropriate evacuation routes and/or the evacuation routes from a decision node. Alternatively, the evacuation routes can be stored in memory 215 and transceiver 230 may only receive an indication of which evacuation route to convey.

Warning unit 235 can include a speaker and/or a display for conveying an evacuation route or routes. The speaker can be used to play an audible voice evacuation message. The evacuation message can be conveyed in one or multiple languages, depending on the embodiment. If multiple evacuation routes are used based on occupancy information or the fact that numerous safe evacuation routes exist, the evacuation message can include the multiple evacuation routes in the alternative. For example, the evacuation message may state "please exit to the left through stairwell A, or to the right through stairwell B." The display of warning unit 235 can be used to convey the evacuation message in textual form for deaf individuals or individuals with poor hearing. Warning unit 235 can further include one or more lights to indicate that an evacuation condition has been detected and/or to illuminate at least a portion of an evacuation route. In the event of an evacuation condition, warning unit 235 can be configured to repeat the evacuation message(s) until a stop evacuation message instruction is received from a decision node, until the response system is reset or muted by a system administrator or other user, or until sensory node 200 malfunctions due to excessive heat, etc. Warning unit 235 can also be used to convey a status message such as "smoke detected in room thirty-five on the third floor." The status message can be played one or more times in between the evacuation message. In an alternative embodiment, sensory node 200 may not include warning unit 235, and the evacuation route(s) may be conveyed only by decision nodes. The evacuation condition may be detected by sensory node 200, or by any other node in direct or indirect communication with sensory node 200.

Processor 240 can be operatively coupled to each of the components of sensory node 200, and can be configured to control interaction between the components. For example, if an evacuation condition is detected by sensor(s) 205, processor 240 can cause transceiver 230 to transmit an indication of the evacuation condition to a decision node. In response, transceiver 230 can receive an instruction from the decision node regarding an appropriate evacuation message to convey. Processor 240 can interpret the instruction, obtain the appropriate evacuation message from memory 215, and cause warning unit 235 to convey the obtained evacuation message. Processor 240 can also receive inputs from user interface 220 and take appropriate action. Processor 240 can further be used to process, store, and/or transmit occupancy information obtained through occupancy unit 225. Processor 240 can further be coupled to power source 210 and used to detect and indicate a power failure or low battery condition. In one embodiment, processor 240 can also receive manually generated alarm inputs from a user through user interface 220. As an example, if a fire is accidently started in a room of a structure, a user may press an alarm activation button on user interface 220, thereby signaling an evacuation condition and activating warning unit 235. In such an embodiment, in the case of accidental alarm activation, sensory node 200 may inform the user that he/she can press the alarm activation button a second time to disable the alarm. After a predetermined period of time (i.e., 5 seconds, 10 seconds, 30 seconds, etc.), the evacuation condition may be conveyed to other nodes and/or an emergency response center through the network.

Figure 3:
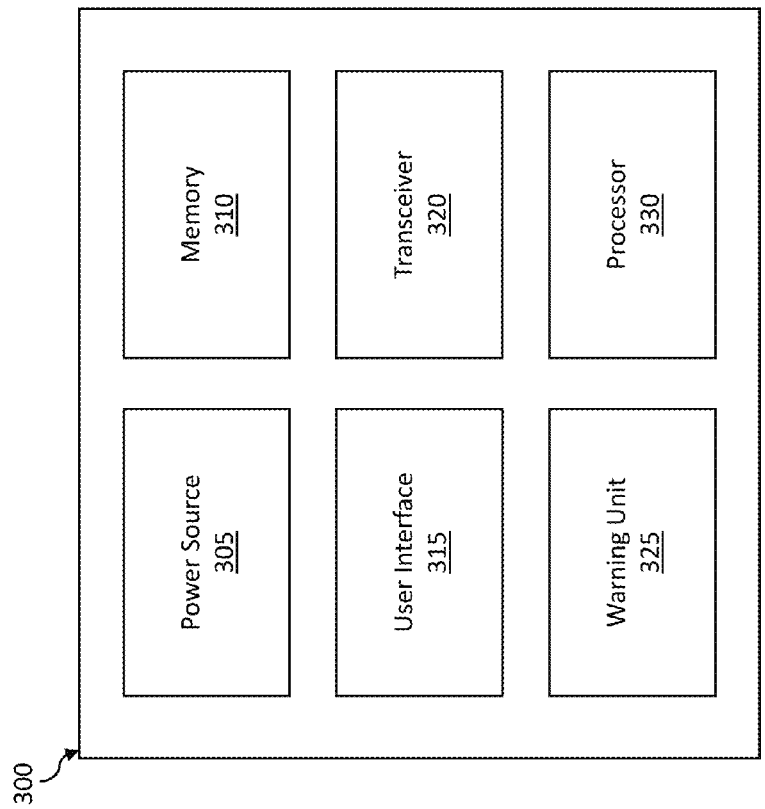
FIG. 3 is a block diagram illustrating a decision node in accordance with an illustrative embodiment.

FIG. 3 is a block diagram illustrating a decision node 300 in accordance with an illustrative embodiment. In alternative embodiments, decision node 300 may include additional, fewer, and/or different components. Decision node 300 includes a power source 305, a memory 310, a user interface 315, a transceiver 320, a warning unit 325, and a processor 330. In one embodiment, decision node 300 can also include sensor(s) and/or an occupancy unit as described with reference to sensory unit 200 of FIG. 2. In an illustrative embodiment, power source 305 can be the same or similar to power source 210 described with reference to FIG. 2. Similarly, user interface 315 can be the same or similar to user interface 220 described with reference to FIG. 2, and warning unit 325 can be the same or similar to warning unit 235 described with reference to FIG. 2.

Memory 310 can be configured to store a layout of the structure(s) in which the response system is located, information regarding the locations of sensory nodes and other decision nodes, information regarding how to contact an emergency response center, occupancy information, occupancy detection and monitoring algorithms, and/or an algorithm for determining an appropriate evacuation route. Transceiver 320, which can be similar to transceiver 230 described with reference to FIG. 2, can be configured to receive information from sensory nodes and other decision nodes and to transmit evacuation routes to sensory nodes and/or other decision nodes. Processor 330 can be operatively coupled to each of the components of decision node 300, and can be configured to control interaction between the components.

In one embodiment, decision node 300 can be an exit sign including an EXIT display in addition to the components described with reference to FIG. 3. As such, decision node 300 can be located proximate an exit of a structure, and warning unit 325 can direct individuals toward or away from the exit depending on the identified evacuation route(s). In an alternative embodiment, all nodes of the response system may be identical such that there is not a distinction between sensory nodes and decision nodes. In such an embodiment, all of the nodes can have sensor(s), an occupancy unit, decision-making capability, etc.

FIG. 4 is a block diagram illustrating a sensing unit 400 in accordance with an illustrative embodiment. In one embodiment, sensing unit 400 can be the sensory node 105. Sensing unit 400 includes a gas detector 402, a microphone detector 404, an infrared detector 406, a scent detector 408, an ultrasonic detection system 410, a processor 412, a memory 414, a user interface 416, an output interface 518, a power source 420, a transceiver 422, and a global positioning system (GPS) unit 424. In alternative embodiments, sensing unit 400 may include fewer, additional, and/or different components. In one embodiment, sensing unit 400 can be made from fire retardant materials and/or other materials with a high melting point or heat tolerance in the event that sensing unit 400 is used at the site of a fire. Alternatively, any other materials may be used to construct sensing unit 400. Gas detector 402, microphone detector 404, infrared detector 406, and scent detector 408 can be used to detect occupancy as described above with reference to occupancy unit 225 of FIG. 2.

Ultrasonic detection system 410 can be configured to detect human presence using ultrasonic wave detection. In one embodiment, ultrasonic detection system 410 can include a wave generator and a wave detector. The wave generator can emit ultrasonic waves into a room or other structure. The ultrasonic waves can reflect off of the walls of the room or other structure. The wave detector can receive and examine the reflected ultrasonic waves to determine whether there is a frequency shift in the reflected ultrasonic waves with respect to the originally generated ultrasonic waves. Any frequency shift in the reflected ultrasonic waves can be caused by movement of a person or object within the structure. As such, an identified frequency shift can be used to determine whether the structure is occupied. Alternatively, processor 412 may be used to identify frequency shifts in the reflected ultrasonic waves. In one embodiment, occupancy unit 225 described with reference to FIG. 2 can also include an ultrasonic detection system.

Processor 412 can be used to process detected signals received from gas detector 402, microphone detector 404, infrared detector 406, scent detector 408, and/or ultrasonic detection system 410. In an illustrative embodiment, processor 412 can utilize one or more signal acquisition circuits (not shown) and/or one or more algorithms to process the detected signals and determine occupancy data. In one embodiment, processor 412 can utilize the one or more algorithms to determine a likelihood that an occupant is present in a structure. For example, if the detected signals are low, weak, or contain noise, processor 412 may determine that there is a low likelihood that an occupant is present. The likelihood can be conveyed to a user of sensing unit 400 as a percentage, a description (i.e., low, medium, high), etc. Alternatively, processor 412 can determine the likelihood that an occupant is present and compare the likelihood to a predetermined threshold. If the likelihood exceeds the threshold, sensing unit 400 can alert the user to the potential presence of an occupant. If the determined likelihood does not exceed the threshold, sensing unit 400 may not alert the user.

In an illustrative embodiment, processor 412 can determine whether occupants are present based on the combined input from each of gas detector 402, microphone detector 404, infrared detector 406, scent detector 408, and/or ultrasonic detection system 410. In an illustrative embodiment, the one or more algorithms used by processor 412 to determine occupancy can be weighted based on the type of sensor(s) that identify an occupant, the number of sensors that identify the occupant, and/or the likelihood of occupancy corresponding to each of the sensor(s) that identified the occupant. As an example, detection by ultrasonic detection system 410 (or any of the other detectors) may be given more weight than detection by scent detector 408 (or any of the other detectors). As another example, processor 412 may increase the likelihood of occupancy as the number of detectors that detected any sign of occupancy increases. Processor 412 can also determine the likelihood of occupancy based on the likelihood corresponding to each individual sensor. For example, if all of the detectors detect occupancy with a low likelihood of accuracy, the overall likelihood of a present occupant may be low. In one embodiment, any sign of occupancy by any of the sensors can cause processor 412 to alert the user. Similarly, processor 412 can provide the user with information such as the overall likelihood of occupancy, the likelihood associated with each sensor, the number of sensors that detected occupancy, the type of sensors that detected occupancy, etc. such that the user can make an informed decision.

Processor 412 can also be used to monitor and track the use of sensing unit 400 such that a report can be created, stored, and/or conveyed to a recipient. As an example, the report can include a time, location, and likelihood of occupancy for each potential occupant that is identified by sensing unit 400. The report can also include any commands received from the user of sensing unit 400, any information received from outside sources and conveyed to the user through sensing unit 400, etc. The report can be stored in memory 414. The report can also be conveyed to an emergency response center, other emergency responders, etc. via transceiver 422.

In addition to informing a user of whether an occupant is detected and/or a likelihood that the detection is accurate, sensing unit 400 can also inform the user whether a detected occupant is a human or an animal (i.e., dog, cat, rat, etc.) using infrared pattern analysis based on information received from infrared detector 406 and/or audible sound analysis based on information received from microphone detector 404. Sensing unit 400 can also use detected information and pattern analysis to determine and convey a number of persons or animals detected and/or whether detected persons are moving, stationary, sleeping, etc. In one embodiment, sensing unit 400 can also use temperature detection through infrared detector 406 and/or any of the other detection methods to help determine and convey whether a detected occupant is dead or alive.

Transceiver 422 can be used to communicate with occupancy unit 225 and/or any other source. As such, sensing unit 400 can receive present occupancy information and/or occupancy pattern information from occupancy unit 225. Sensing unit 400 can use the present occupancy information and/or occupancy pattern information to help determine a likelihood that one or more humans is present in a given area. For example, the occupancy pattern information may indicate that there is generally a large number of people in a given area at a given time. If used in the given area at or near the given time, the occupancy detection algorithms used by sensing unit 400 may be adjusted such that any indication of occupancy is more likely to be attributed to human occupancy. The present occupancy information can be similarly utilized. Transceiver 422 can also be used to receive information regarding the type of evacuation condition, a location of the evacuation condition, a temperature at a given location, a toxic gas concentration at a given location, etc. The information, which can be received from the response system, an emergency response center, and/or any other source, can be used by the user to identify high risk areas, to identify an optimal route to a given location, etc.

Global positioning system (GPS) unit 424 can be configured to direct a user of sensing unit 400 to a known location of an occupant using output interface 518. The known location can be received from occupancy unit 225, from an emergency response center, and/or from any other source. In an alternative embodiment, sensing unit 400 can receive verbal and/or textual directions to a known location of an occupant. The verbal and/or textual directions can be received from occupancy unit 225, from the emergency response center, and/or from any other source. The verbal and/or textual directions can be conveyed to a user through output interface 518.

In one embodiment, the system herein can be implemented using a remote server that is in communication with a plurality of sensory nodes that are located in a dwelling. The remote server can be used to process information reported by the sensory nodes and to control the sensory nodes. In one embodiment, the remote server can replace the decision node(s) such that a given dwelling is only equipped with the sensory nodes. In such an embodiment, the system can be implemented using cloud computing techniques as known to those of skill in the art.

In some instances, using a static setpoint to determine whether a sensed variable is indicative of an abnormal condition may not be suitable. In such instances, determining setpoints based on historical data of the sensed variable can provide a robust and accurate system that can reduce the number of false alarms. Reducing the number of false alarms can prevent alarm fatigue in which users ignore alarms because the users assume that the alarms are false alarms.

Figure 5:
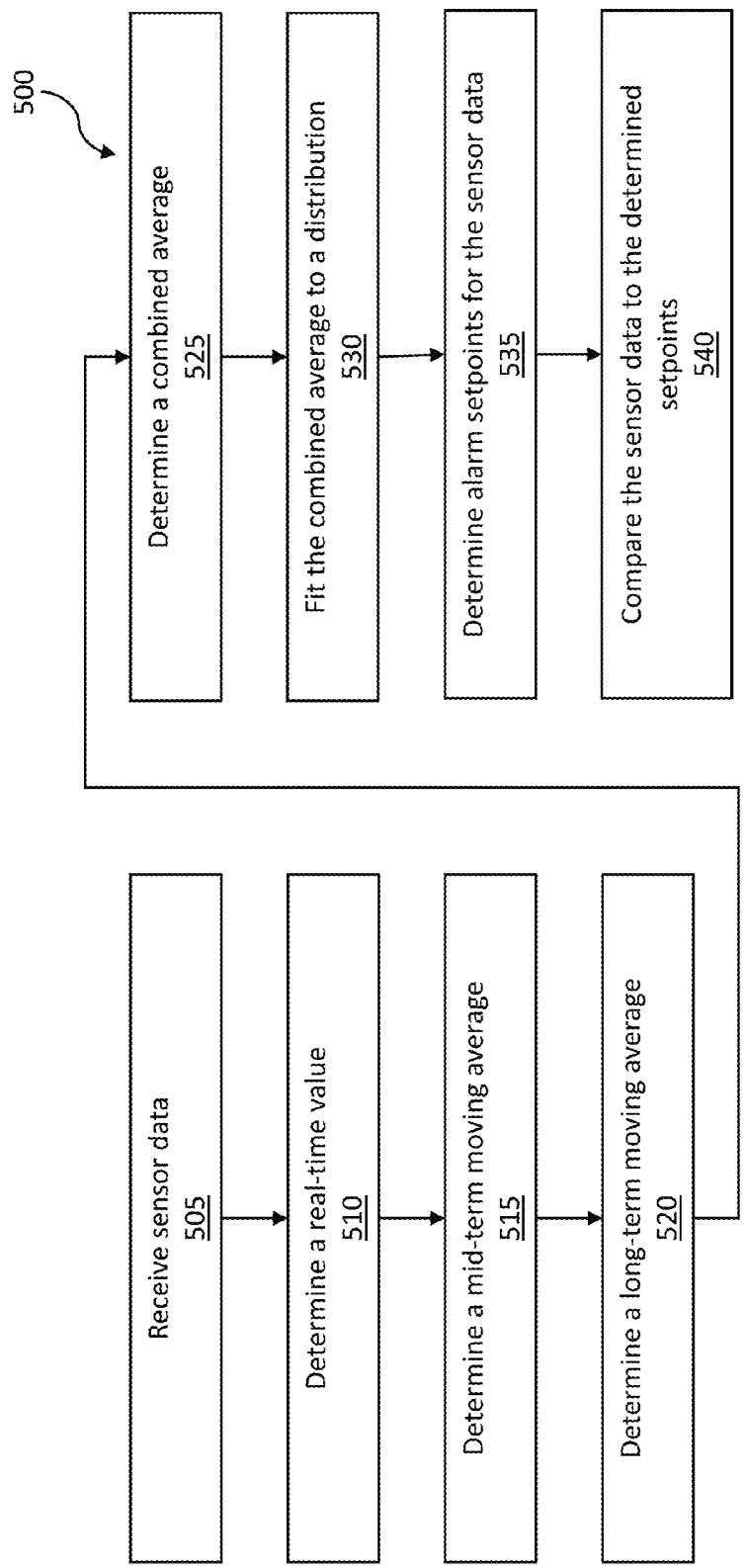
FIG. 5 is a flow diagram of a method for monitoring sensor data in accordance with an illustrative embodiment.

FIG. 5 is a flow diagram of a method for monitoring sensor data in accordance with an illustrative embodiment. In alternative embodiments, additional, fewer, and/or different operations may be performed. Also, the use of a flow diagram and arrows is not meant to be limiting with respect to the order or flow of operations. For example, in an illustrative embodiment, two or more of the operations of the method 500 can be performed simultaneously.

In an operation 505, sensor data is received. In an illustrative embodiment, sensor data is received from a node such as sensory node 400. In an illustrative embodiment, the decision node 300 receives the sensor data. The sensor data can include one or more measurements such as smoke obscuration, temperature (e.g., inside temperature, outside temperature, water temperature, equipment temperature), humidity, carbon dioxide concentration, carbon monoxide concentration, oxygen concentration, water flow (e.g., through pipes), etc. The sensor data can be received at any suitable rate, such as once per three minutes. In alternative embodiments, sensor data can be received more often or less often than once per three minutes. For example, sensor data can be received multiple times per second, once per second, once per four seconds, once per minute, once per ten minutes, once per half-hour, once per hour, once per day, once per week, once per month, etc.

In an illustrative embodiment, sensor data is scheduled to be received at regular intervals. For example, a temperature measured by a sensor can be scheduled to be received once per three minutes. In alternative embodiments, any suitable rate can be used such as once per second, once per thirty seconds, once per minute, once per ten minutes, once per thirty minutes, once per hour, once per day, etc. In some instances, sensor data may not be received at a scheduled or expected time. For example, communication errors, power outages, or a temporary disablement of the sensor (e.g., during testing or setup) may cause data to not be received. In such an embodiment, any suitable means can be used to compensate for the missing data. For example, the missing data can be filled with the last received data or an average value of the two data points on either side of the missing data (e.g., the last received data before the missing data and the first received data after the missing data). In an illustrative embodiment, the missing data can be ignored from the data set.

In an operation 510, a real-time value is determined. In an illustrative embodiment, the real-time value is the most recent value received from the sensor. In an alternative embodiment, the operation 510 includes determining a short-term moving average for use as the real-time value. In an illustrative embodiment, a short-term average of the sensor data can be determined for the past three minutes of received sensor data and used as the real-time value. In such an embodiment, the sensor data received in the previous three minutes is averaged. In some embodiments, the average of the sensor data of the previous three minutes is determined by the sensor that detected the sensor data (or any other remote computing device) and the average is transmitted to the decision node 300. In alternative embodiments, the short-term moving average can be determined for any suitable time frame, which can be less than or greater than three minutes. Any suitable average technique can be used. For example, a weighted average can be determined. In such an embodiment, more recent sensor data can be weighted more than older sensor data. In an alternative embodiment, a mathematical or arithmetic average of the sensor data is determined.

In an operation 515, a mid-term moving average is determined. In an illustrative embodiment, an average of the sensor data can be determined for the past thirty minutes of received sensor data. In such an embodiment, the sensor data received in the previous thirty minutes is averaged. In alternative embodiments, the mid-term moving average can be determined for any suitable time frame, which can be less than or greater than thirty minutes. Any suitable average technique can be used. For example, a weighted average can be determined. In such an embodiment, more recent sensor data can be weighted more than older sensor data. In an alternative embodiment, a mathematical or arithmetic average of the sensor data is determined.

In an operation 520, a long-term moving average is determined. In an illustrative embodiment, an average of the sensor data can be determined for the past three hours of received sensor data. In such an embodiment, the sensor data received in the previous three hours is averaged. In alternative embodiments, the long-term moving average can be determined for any suitable time frame, which can be less than or greater than three hours. Any suitable average technique can be used. For example, a weighted average can be determined. In such an embodiment, more recent sensor data can be weighted more than older sensor data. In an alternative embodiment, a mathematical or arithmetic average of the sensor data is determined.

In an embodiment in which the data set includes missing data (e.g., caused by a temporary communication failure), the operation 515 and the operation 520 can include ignoring the missing data. For example, sensor data can be received every three minutes, and the mid-term moving average can be the average sensor data over the previous thirty minutes. If there is no missing data, the mid-term moving average can be the average of ten real-time values (each received every three minutes). If there is missing data, the mid-term moving average can be the average of whatever sensor data was received over the previous thirty minutes. For example, if there was a communications outage for twenty minutes, the operation 515 can include determining an average of the three received real-time values during the previous thirty minutes. In embodiments in which no data was received in the previous thirty minutes, the operation 515 can include using the previously-determined mid-term average. The same methodology can be applied to the operation 520.

In an operation 525, a combined average is determined. The combined average is an average of the real-time value, the mid-term average, and the long-term average. Thus, the combined average is an average of averages. Any suitable average technique can be used. For example, a weighted average can be determined. In such an embodiment, more recent sensor data can be weighted more than older sensor data. In an alternative embodiment, a mathematical or arithmetic average of the sensor data is determined. In some embodiments, the combined average can be an average of a suitable number of averages, such as two averages, three averages, four averages, five averages, etc.

In an operation 530, multiple combined averages are fit to a distribution. Any suitable number of combined averages can be used. In an illustrative embodiment, the combined averages for the past thirty days are fit to a distribution. In alternative embodiments, the combined averages of more than or less than thirty days can be fit to a distribution. Any suitable distribution can be used. In an illustrative embodiment, the combined averages are fit to a normal distribution. In alternative embodiments, a beta distribution can be used. In an illustrative embodiment, the operation 530 includes determining a mean and/or a standard deviation for the multiple combined averages. In an illustrative embodiment, the operation 530 can include determining a mean of the combined averages, a standard deviation of the combined averages, and a goodness-of-fit value of the combined averages to the distribution.

Figure 6:
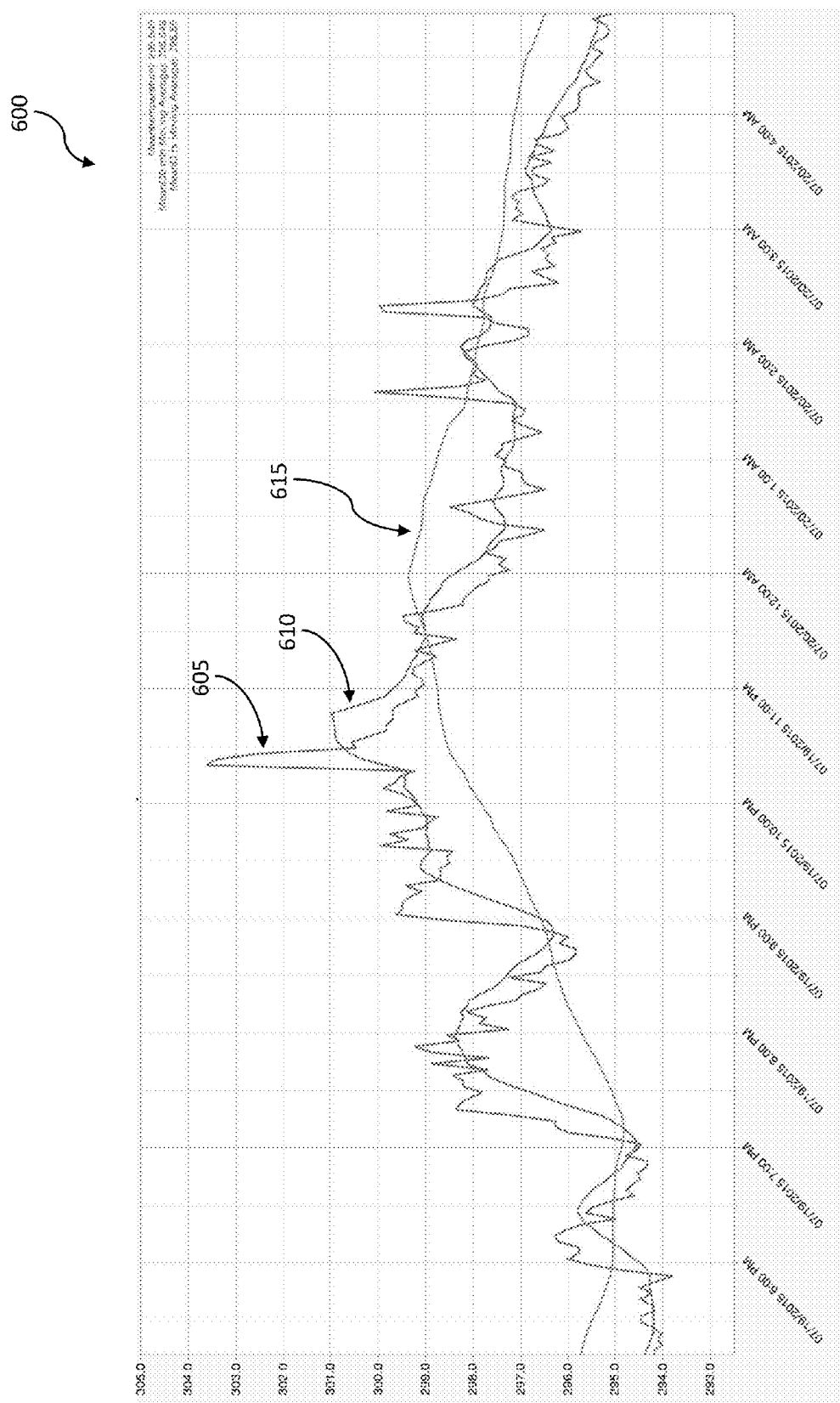
FIG. 6 is a graph of a real-time value, a mid-term average, and a long-term average of a temperature over time in accordance with an illustrative embodiment.

FIG. 6 is a graph of a real-time value, a mid-term average, and a long-term average of a temperature over time in accordance with an illustrative embodiment. The x-axis of the graph 600 is time and spans about twelve hours. The y-axis of the graph 600 is temperature in Kelvin. Line 605 plots the real-time value of a temperature received from a sensor. The real-time value is of the instantaneous temperature every three minutes. Line 610 plots the mid-term average of the temperature received from a sensor. The mid-term average is of the temperature over thirty minutes. Line 615 plots the long-term average of the temperature received from a sensor. The long-term average is of the temperature over three hours. The graph 600 shows that the real-time value fluctuates more than the mid-term average and that the mid-term average fluctuates more than the long-term average.

In an operation 535, alarm setpoints for the sensor data are determined. In an illustrative embodiment, the operation 535 includes determining an upper and/or a lower setpoint for the sensor data. In an illustrative embodiment, an upper setpoint is determined by adding three standard deviations to the mean of the multiple combined averages. In an illustrative embodiment, a lower setpoint is determined by subtracting three standard deviations to the mean of the multiple combined averages.

In alternative embodiments, more or fewer than three standard deviations can be added or subtracted to the mean to determine the upper or lower setpoints, respectively. For example, for a set of data that fits the distribution in the operation 530 well, six standard deviations from the mean can be used for the setpoints. In another example, a set of data that does not fit the distribution in the operation 530 well, one standard deviation from the mean can be used for the setpoints. In an illustrative embodiment, a goodness of fit function can be used to adjust the number of standard deviations from the mean that are used to determine the setpoints. For example, the Shapiro-Wilk goodness of fit function can be used to provide a fit value of zero (corresponding to a very poor fit) to one (corresponding with a perfect fit). The fit value can be used to determine the number of standard deviations from the mean to use to determine the setpoints. For example, a fit value of zero can correspond to one standard deviation being used, and a fit value of one can correspond to six standard deviations being used. In such an example, a fit value of 0.5 can correspond to 3.5 standard deviations being used. In alternative embodiments any suitable range of standard deviations can be used (e.g., other than 1-6 standard deviations in the example above).

In an illustrative embodiment, a computer programming function can be used to determine a goodness of fit value. For example, a SciPy Shapiro-Wilk test function can be used (e.g., scipy.stats.shapirio(x, a=None, reta=False)). SciPy is an open-source collection of mathematical algorithms and convenience functions built on the Numpy extension of the Python programming language. The SciPy Shapiro-Wilk test can return a value W that ranges from zero to one and indicates the goodness of fit for the data array "x." In such an example, the setpoints can be determined using the following formulas:

$$USP=Avg_{com}+\sigma \cdot (5 \cdot W+1)$$

$$LSP=Avg_{com}-\sigma \cdot (5 \cdot W+1)$$

where USP is the upper set point, LSP is the lower set point, $Avg_{com}$ is the combined average (discussed above), $\sigma$ is the standard deviation of the combined data, and W is a fit value that ranges from zero to one. In alternative embodiments, any suitable goodness of fit test and statistic can be used, such as the Kolmogorov-Smirnov goodness of fit test. In such embodiments, the formulas for determining the upper and lower setpoints can be modified accordingly. For example, using the Kolmogorov-Smirnov goodness of fit test and using D as the test statistic (e.g., with values ranging from −0.5 to 0.5), an example of the setpoint formulas is:

$$USP=Avg_{com}+\sigma \cdot (10 \cdot D+6)$$

$$LSP=Avg_{com}-\sigma \cdot (10 \cdot D+6).$$

Figure 7:
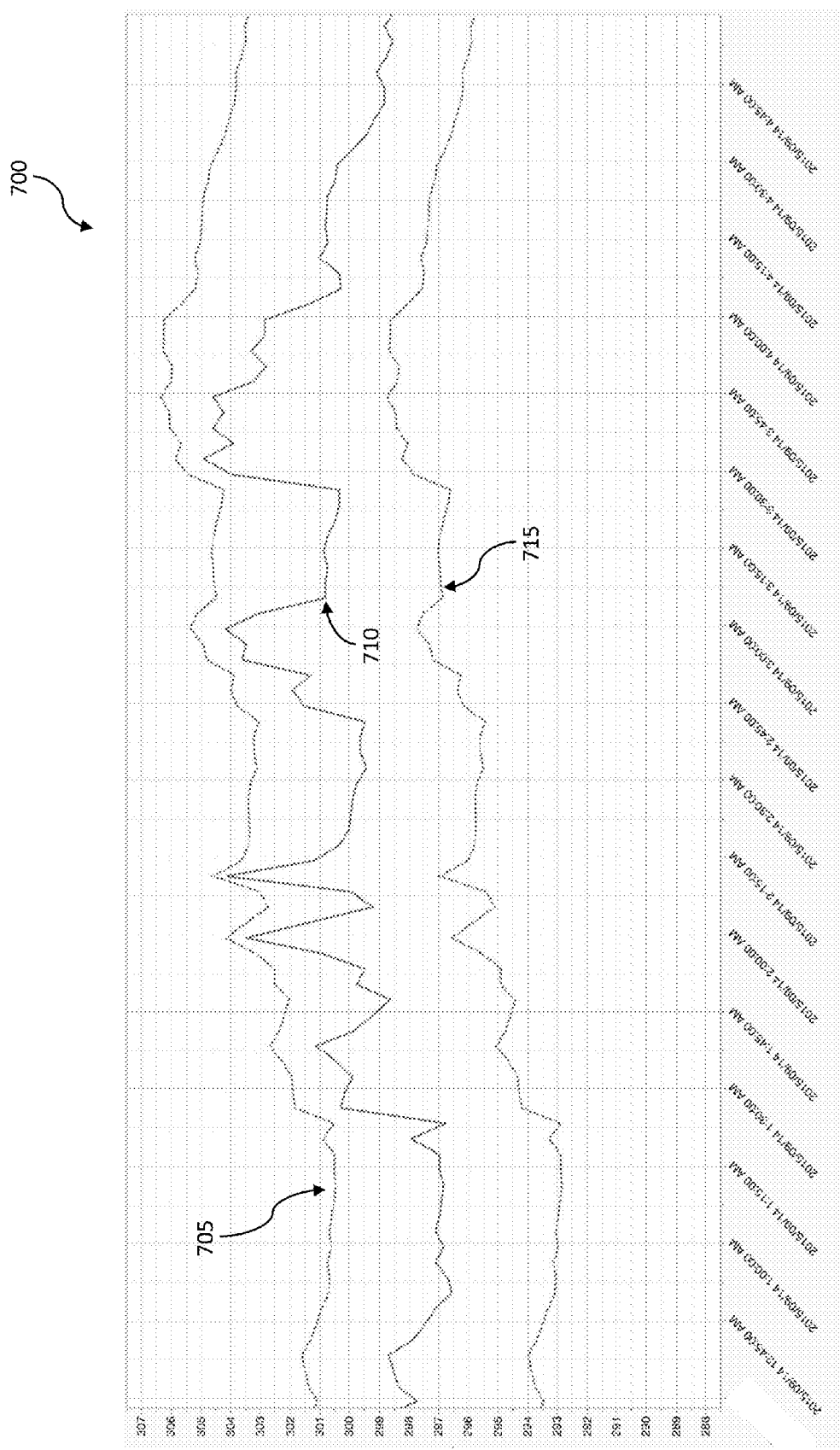
FIG. 7 is a graph of a temperature with upper and lower setpoints over time in accordance with an illustrative embodiment.

FIG. 7 is a graph of a temperature with upper and lower setpoints over time in accordance with an illustrative embodiment. The x-axis of the graph 700 is of time and spans about four and a half hours. The y-axis of the graph 700 is of temperature in Kelvin. The line 710 is a plot of the instantaneous temperature, the line 705 is a plot of the upper setpoint, and the line 715 is a plot of the lower set point. As shown by the graph 700, the upper and lower setpoints are affected by the instantaneous temperature changes (e.g., the real-time value), but the fluctuations over time of the upper and lower setpoints are not as large as the fluctuations as the instantaneous temperature because the upper and lower setpoints are determined using a real-time value along with a mid-term average and a long-term average. The graph 700 does not illustrate that an alarm condition existed during the time period plotted because the line 710 does not deviate outside of the upper or lower setpoints (e.g., the line 710 is not at any point above the line 705 or below the line 715).

In an operation 540, the sensor data is compared to the determined setpoints. In an illustrative embodiment, the sensor data received in the operation 505 is compared to the determined setpoints. If a sensor measurement is outside of the determined setpoints (e.g., greater than the upper setpoint or lower than the lower setpoint), it can be determined that an alarm condition exists. If it is determined that an alarm condition exists, any suitable actions can be taken such as sounding an alarm, notifying occupants, notifying users, notifying emergency personnel, etc.

The method 500 can be used to determine if a sensor measurement is abnormal. Some measurements fluctuate over time and what is considered "normal" fluctuates over time. In an illustrative embodiment, using a combined average moves what is considered "normal" with time. For example, from July through December, the average indoor temperature can change from 75° F. in July to 65° F. in December. In July the normal indoor temperature can be 75° F.±7° F., and in December the normal indoor temperature can be 65° F.±10° F. In such an example, a pre-determined static setpoints may be either too sensitive or not sensitive enough. For example, an upper setpoint of 82° F. may be appropriate in July, but may be too high in December. Similarly, an upper setpoint of 75° F. may be appropriate in December, but may be too low in July. Thus, in some instances, using static setpoints may not provide an indication of an abnormal or that a dangerous condition exists. The method 500 can also be used to provide earlier event detection compared to an alarming method that uses static setpoint. The method 500 can send useful feedback to an owner, occupant, user, responder, etc. that can allow such a person to take action that could prevent or mitigate a loss.

In alternative embodiments, the method 500 can be used for any suitable purpose. For example, multiple upper setpoints and/or multiple lower setpoints may be determined for various purposes. In an illustrative embodiment, a first upper setpoint and a first lower setpoint are used for warnings, and a second upper setpoint and a second lower setpoint are used for alarms. In such an embodiment, the first upper and lower setpoints can be closer to the combined average than the second upper and lower setpoints. Thus, the first upper or lower setpoint will result in a warning before the second upper or lower setpoint results in an alarm. In alternative embodiments, any suitable number of setpoints can be used to provide any suitable level of sensitivity.

In another example, the method 500 can be used to calculate a factor value. The factor value can be an indication of how far off from an expected value that the real-time value is. For example, the factor value can indicate the number of standard deviations that the most recent sensor data is from the historical data of that sensor. The factor value can be used, for example, to determine a risk that an evacuation condition or alarm condition exists (e.g., in a Bayesian Network, as explained in greater detail below). For example, the sensor data can be related to a temperature in a living room. The factor value can indicate how different the current temperature is from historical temperatures (e.g., the number of standard deviations from the average temperature of the room). If the factor value is high enough (or low enough), it can be determined that the risk that there is a fire in the room is high.

In an illustrative embodiment, a machine learning algorithm can be used to obtain knowledge of various patterns. For example, the setpoints can be adjusted based on a time of year, a season, a month, a week, a day, an hour, a minute, etc. In such an embodiment, any suitable machine learning algorithm can be used such as software packages using KNIME® or JMP® software. In some illustrative embodiments, machine learning algorithm libraries such as scikit-learn in Python®, theano from LISA lab, or MLlib from Apache Spark™ can be used. In an illustrative embodiment, a learning algorithm can be used to determine probability distribution function fits, such as the distribution fits described above. In some embodiments, a smoothing fit can be generated and used as the distribution in the operation 530. For example, the smoothing fit can be a type of spline function fit or a spline interpolation.

Figure 8:
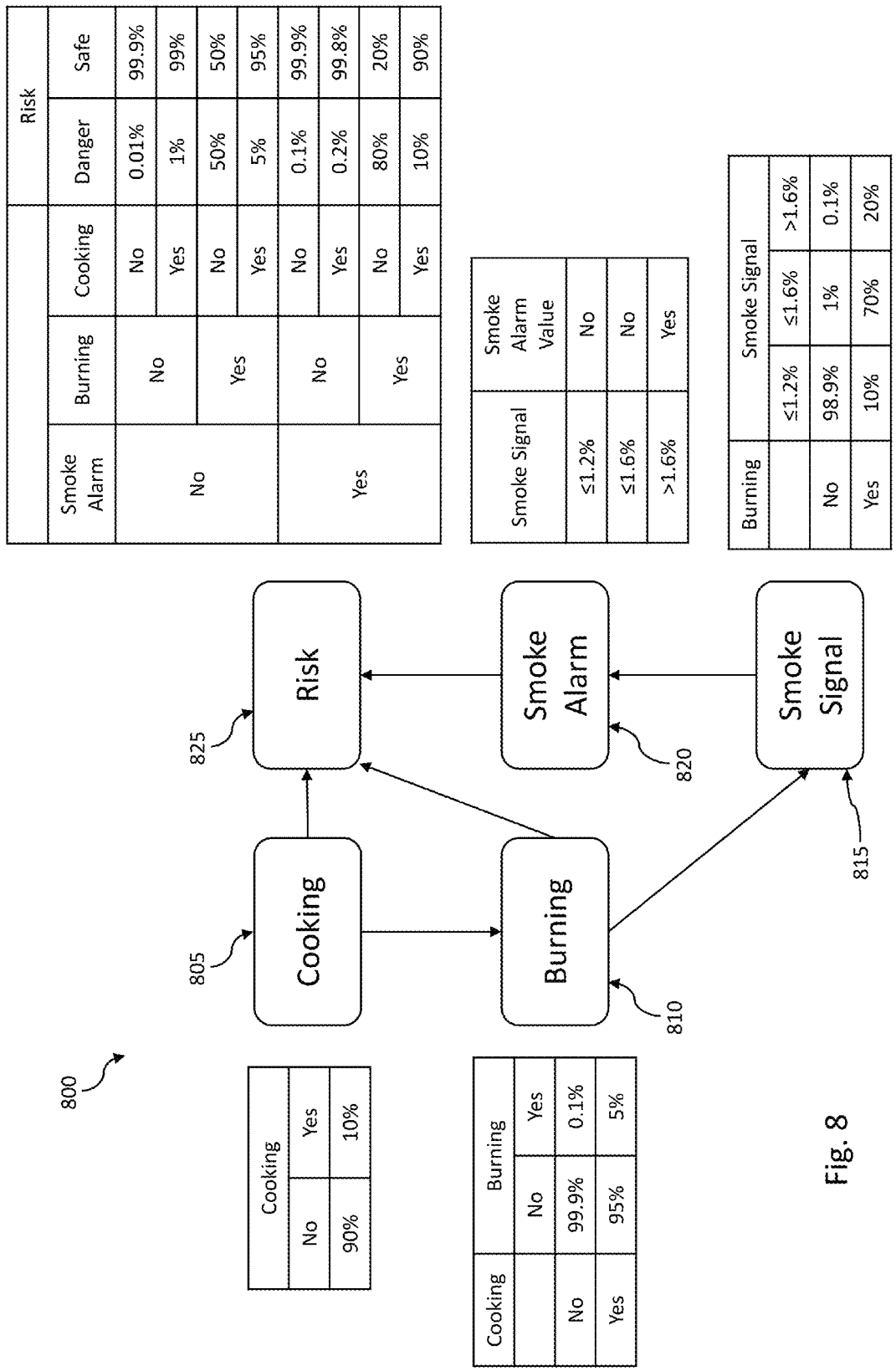
FIG. 8 is a Bayesian Network diagram for determining a risk in accordance with an illustrative embodiment.

In an illustrative embodiment, multiple sensors and/or sources of data can be used together to determine whether a risk condition exits. For example, Bayesian Networks can be used. Bayesian Networks or Neural Networks can be used to make inferences based on what is known and what is unknown. FIG. 8 is a Bayesian Network diagram for determining a risk in accordance with an illustrative embodiment. FIG. 8 is meant to be illustrative only and is not meant to be limiting with respect to the order or number of nodes or flow of information.

In the network 800, dependent variable relationships are shown via arrows. For example, whether a person is cooking (i.e., box 805) impacts the odds that some food is burning (i.e., box 810) and what the risk of a dangerous condition existing is (i.e., box 825). Similarly, whether the smoke alarm goes off is related to the amount of smoke detected by a smoke sensor (i.e., box 815). For example, if the smoke signal 815 is above 1.6% obscuration, the smoke alarm should alarm.

Next to each of the boxes in FIG. 8 is a conditional probability table that corresponds to the box. For example, at any given point in time, the probability that someone is cooking in the kitchen is 10%. In another example, at any given point in time, if someone is not cooking, there is a 99.9% chance that some food is not burning, but if someone is cooking, there is a 5% chance that some food is burning. The numbers in the conditional probability tables in FIG. 8 are illustrative only. In alternative embodiments, any suitable numbers can be used. For example, the probabilities can be determined observationally by gathering data over time. In some embodiments, the probabilities are determined via data gathered from the system that the Bayesian Network represents. For example, the network 800 can be representative of a single family house, and the probabilities can be determined by observing data indicating whether someone is cooking in the house, whether some food is burning in the house, what the smoke signal from a smoke sensor in the house is, and whether a smoke alarm in the house is in an alarm mode. In alternative embodiments, the probabilities can be predetermined based on similar networks. For example, the network 800 can be representative of a single family house and the probabilities can be determined based on data gathered from other single family houses.

The Bayesian Network of FIG. 8 can be used to infer conditions that are not known based on conditions that are known. FIG. 9 is a Bayesian Network diagrams and corresponding risks based on known information in accordance with an illustrative embodiment. In the example illustrated in FIG. 9, if a smoke detector corresponding to box 820 is in alarm mode and no other information is known, then it can be inferred that the smoke signal corresponding to box 815 is above 1.6% obscuration. Similarly, the chance that some food is burning increases to 54.28% from the baseline condition (e.g., no information known about any box), and the chance that someone is cooking increases to 50.37%. Based on the inferred numbers, the risk that a dangerous condition exists increases to 11.27%.

Following the example above, additional data related to the other boxes can further impact the risk that a dangerous condition exists. FIG. 10 is Bayesian Network diagram and corresponding risks based on known information in accordance with an illustrative embodiment. In the example illustrated in FIG. 10, if the smoke detector is in an alarm mode and a user provides an indication that the user is cooking, it can be inferred that the smoke signal corresponding to box 815 is above 1.6% obscuration. Further, the chance that some food is burning increases to 92.32% from the baseline condition (e.g., no information known about any box), and the risk that a dangerous condition exists decreases to 9.15%.

Similarly, FIG. 11 is a Bayesian Network diagram and corresponding risks based on known information in accordance with an illustrative embodiment. In the example illustrated in FIG. 11, if the smoke detector is in an alarm mode and a user provides an indication that the user is not cooking, it can be inferred that the smoke signal corresponding to box 815 is above 1.6% obscuration. Further, the chance that some food is burning decreases to 0% from the baseline condition (e.g., no information known about any box), and the risk that a dangerous condition exists increases to 80%.

Figure 12A:
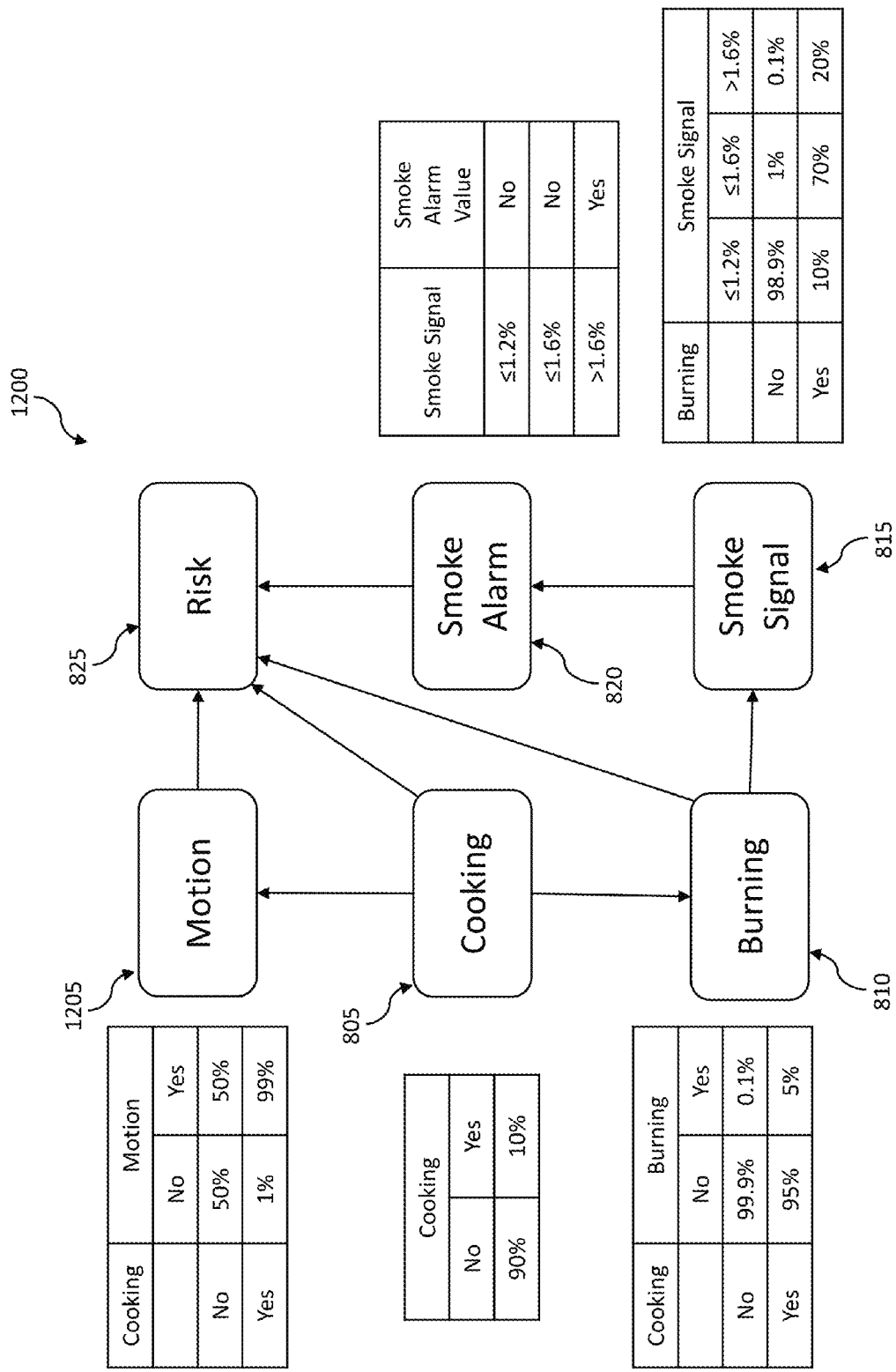

FIGS. 12A and 12B are a Bayesian Network diagram for determining a risk in accordance with an illustrative embodiment. The network 1200 of FIG. 12A is the network 800 with the addition of motion (i.e., box 1205). The motion box 1205 can correspond to a motion sensor in the kitchen of a household. The conditional probability table of FIG. 12B corresponds to the risk box 825 of FIG. 12A. FIGS. 13-15 are Bayesian Network diagrams and corresponding risks based on known information in accordance with illustrative embodiments.

As shown in FIG. 13, if there is no smoke alarm and the smoke signal is below 1.2% obscuration, the chance that some food is burning is less than 1%, the chance that someone is cooking is about 10%, and the chance that there is motion in the kitchen is about 55%.

FIG. 14 illustrates the condition of a smoke alarm in alarm mode and the motion sensor detecting motion. Based on these two conditions, it can be determined that there is an 82% chance that someone is cooking, and there is about an 87% chance that some food is burning. Based on such conditions, there is about an 88% chance that the house is safe.

FIG. 15 illustrates the condition of a smoke alarm in alarm mode and the motion sensor not detecting motion. Based on these two conditions, it can be determined that there is about a 95% chance that no one is cooking, and there is about a 44% chance that some food is burning. Based on such conditions, it can be determined that the chance that a dangerous condition exists is about 38%.

Figure 16:
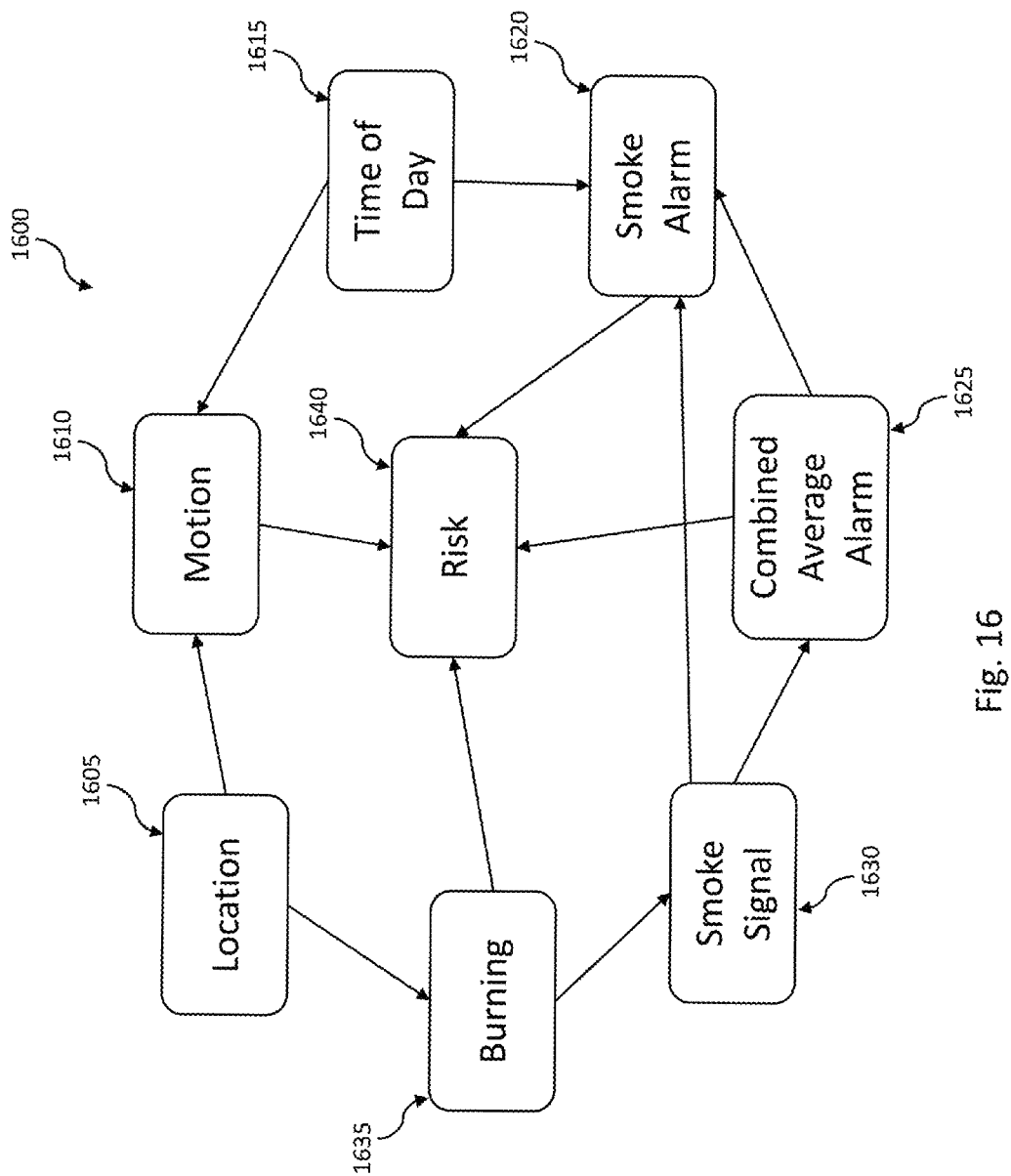
FIG. 16 is a Bayesian Network diagram for determining a risk in accordance with an illustrative embodiment.

In some embodiments, more complex Bayesian Networks than those shown in FIGS. 8 and 12A can be used. For example, FIG. 16 is a Bayesian Network diagram for determining a risk in accordance with an illustrative embodiment. In alternative embodiments, any suitable nodes corresponding to known or unknown variables can be used. In the network 1600 illustrated in FIG. 16, such nodes include a location box 1605, a motion box 1610, a time of day box 1615, a smoke alarm box 1630, a combined average alarm box 1625, a smoke signal box 1630, and a burning food box 1635. In the network 1600, the location, motion, time of day, smoke alarm, combined averages alarm, and the smoke signal can all be known variables. For example, the various sensors can be located in the kitchen, and, therefore, the location is known. A motion sensor can provide information as to whether there is motion in the kitchen. The time of day can be known based on a clock. The smoke alarm can be known based on whether a smoke detector is in alarm state. The combined average alarm (e.g., whether a sensor is above an upper or lower setpoint based on the method 500) can be monitored. The smoke signal can be an indication of the smoke obscuration detected by a smoke sensor. Based on the known variables, whether there is burning food and the risk that a dangerous condition exists can be determined, as explained above.

In an illustrative embodiment, nodes of a Bayesian Network can include any suitable type of information, such as third-party information. For example, a node can include information from a weather service. The weather information can indicate the chance of particular types of weather such as rain, high heat, extreme cold, floods, tornados, etc. In an illustrative embodiment, the third-party information can include information received from an insurance company, such as the number and type of previous insurance claims that have been filed on a related property (e.g., a home that the Bayesian Network models). In alternative embodiments, any suitable third-party or other outside information can be included in one or more Bayesian Network nodes.

In some embodiments, multiple Bayesian Networks can be used together to create even more complex Bayesian Networks. For example, in an apartment building, multiple kitchens can each have a network 1600, and each of the networks 1600 can take into consideration nodes from other networks 1600. In such an example, if it is determined that there is a high risk that a dangerous condition exists in one kitchen, the risk that a dangerous condition exists can be increased for a kitchen that is located above the one kitchen.

In an illustrative embodiment, machine learning algorithms can be used to create or refine a Bayesian Network. For example, a machine learning technique known as "Deep Learning" can be used to automate the building and/or testing of Bayesian Networks. The machine learning algorithm can be used to detect patterns in the Bayesian Network to thereby determine more accurate risk predictions.

Figure 17:
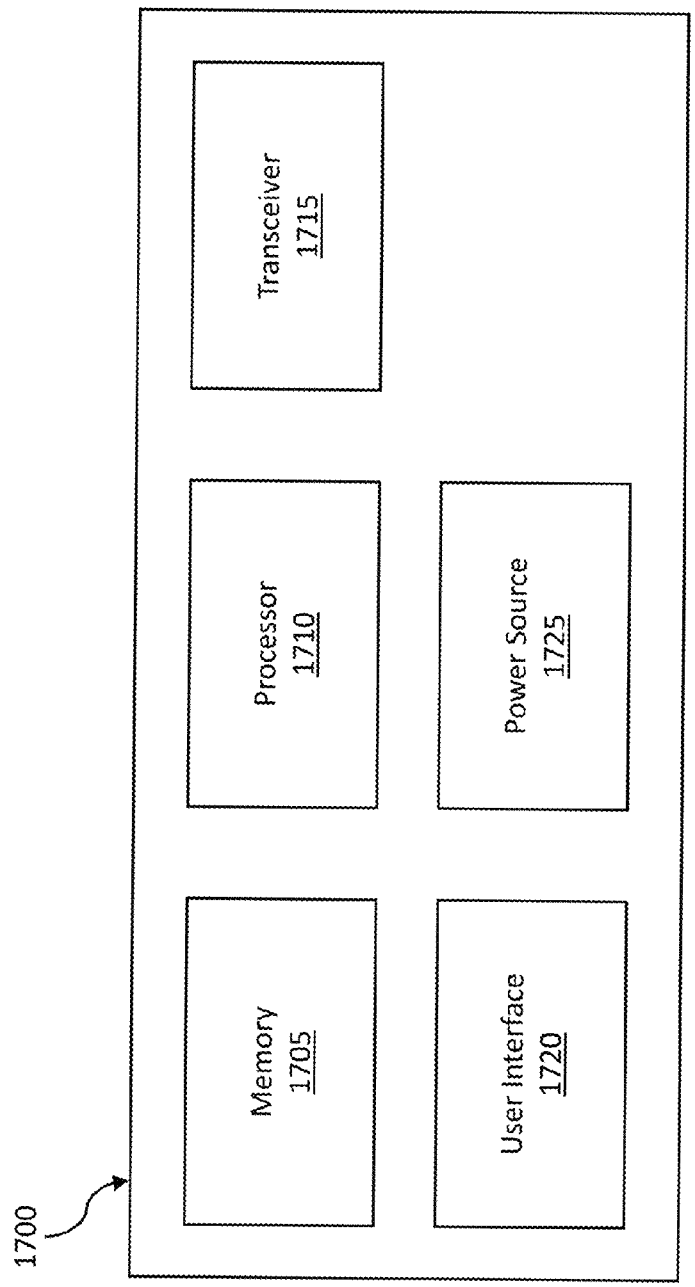
FIG. 17 is a block diagram of a computing device in accordance with an illustrative embodiment.

FIG. 17 is a block diagram of a computing device in accordance with an illustrative embodiment. An illustrative computing device 1700 includes a memory 1705, a processor 1710, a transceiver 1715, a user interface 1720, and a power source 1725. In alternative embodiments, additional, fewer, and/or different elements may be used. The computing device 1700 can be any suitable device described herein. For example, the computing device 1700 can be a desktop computer, a laptop computer, a smartphone, a specialized computing device, etc. The computing device 1700 can be used to implement one or more of the methods described herein.

In an illustrative embodiment, the memory 1705 is an electronic holding place or storage for information so that the information can be accessed by the processor 1710. The memory 1705 can include, but is not limited to, any type of random access memory (RAM), any type of read only memory (ROM), any type of flash memory, etc. such as magnetic storage devices (e.g., hard disk, floppy disk, magnetic strips, etc.), optical disks (e.g., compact disk (CD), digital versatile disk (DVD), etc.), smart cards, flash memory devices, etc. The computing device 1700 may have one or more computer-readable media that use the same or a different memory media technology. The computing device 1700 may have one or more drives that support the loading of a memory medium such as a CD, a DVD, a flash memory card, etc.

In an illustrative embodiment, the processor 1710 executes instructions. The instructions may be carried out by a special purpose computer, logic circuits, or hardware circuits. The processor 1710 may be implemented in hardware, firmware, software, or any combination thereof. The term "execution" is, for example, the process of running an application or the carrying out of the operation called for by an instruction. The instructions may be written using one or more programming language, scripting language, assembly language, etc. The processor 1710 executes an instruction, meaning that it performs the operations called for by that instruction. The processor 1710 operably couples with the user interface 1720, the transceiver 1715, the memory 1705, etc. to receive, to send, and to process information and to control the operations of the computing device 1700. The processor 1710 may retrieve a set of instructions from a permanent memory device such as a ROM device and copy the instructions in an executable form to a temporary memory device that is generally some form of RAM. An illustrative computing device 1700 may include a plurality of processors that use the same or a different processing technology. In an illustrative embodiment, the instructions may be stored in memory 1705.

In an illustrative embodiment, the transceiver 1715 is configured to receive and/or transmit information. In some embodiments, the transceiver 1715 communicates information via a wired connection, such as an Ethernet connection, one or more twisted pair wires, coaxial cables, fiber optic cables, etc. In some embodiments, the transceiver 1715 communicates information via a wireless connection using microwaves, infrared waves, radio waves, spread spectrum technologies, satellites, etc. The transceiver 1715 can be configured to communicate with another device using cellular networks, local area networks, wide area networks, the Internet, etc. In some embodiments, one or more of the elements of the computing device 1700 communicate via wired or wireless communications. In some embodiments, the transceiver 1715 provides an interface for presenting information from the computing device 1700 to external systems, users, or memory. For example, the transceiver 1715 may include an interface to a display, a printer, a speaker, etc. In an illustrative embodiment, the transceiver 1715 may also include alarm/indicator lights, a network interface, a disk drive, a computer memory device, etc. In an illustrative embodiment, the transceiver 1715 can receive information from external systems, users, memory, etc.

In an illustrative embodiment, the user interface 1720 is configured to receive and/or provide information from/to a user. The user interface 1720 can be any suitable user interface. The user interface 1720 can be an interface for receiving user input and/or machine instructions for entry into the computing device 1700. The user interface 1720 may use various input technologies including, but not limited to, a keyboard, a stylus and/or touch screen, a mouse, a track ball, a keypad, a microphone, voice recognition, motion recognition, disk drives, remote controllers, input ports, one or more buttons, dials, joysticks, etc. to allow an external source, such as a user, to enter information into the computing device 1700. The user interface 1720 can be used to navigate menus, adjust options, adjust settings, adjust display, etc.

The user interface 1720 can be configured to provide an interface for presenting information from the computing device 1700 to external systems, users, memory, etc. For example, the user interface 1720 can include an interface for a display, a printer, a speaker, alarm/indicator lights, a network interface, a disk drive, a computer memory device, etc. The user interface 1720 can include a color display, a cathode-ray tube (CRT), a liquid crystal display (LCD), a plasma display, an organic light-emitting diode (OLED) display, etc.

In an illustrative embodiment, the power source 1725 is configured to provide electrical power to one or more elements of the computing device 1700. In some embodiments, the power source 1725 includes an alternating power source, such as available line voltage (e.g., 120 Volts alternating current at 60 Hertz in the United States). The power source 1725 can include one or more transformers, rectifiers, etc. to convert electrical power into power useable by the one or more elements of the computing device 1700, such as 1.5 Volts, 8 Volts, 12 Volts, 24 Volts, etc. The power source 1725 can include one or more batteries.

Example 1

Data was collected from a temperature sensor for several weeks. For each new data point received after a month, a real-time value, a mid-term average, and a long-term average of the data was calculated. The real-time value was the instantaneous value every three minutes, the mid-term average was the average temperature for the previous thirty minutes, and the long-term average was the average temperature for the previous three hours. A combined average was determined for each data point by averaging the real-time value, the mid-term average, and the long-term average. A period of eight hours was chosen for the example. The temperature during the eight-hour period was relatively stable, and the real-time value, the mid-term average, and the long-term average were all about the same value of about 72° F. A stable and consistent eight-hour period was chosen because a manipulation of the data would show the effect of the manipulation without alternative causes of the effect. The standard deviation of the combined averages for the previous thirty days was about 1.27° F. The upper setpoint was set to three standard deviations above the combined average, and the lower setpoint was set to three standard deviations below the combined average.

At a mid-point during the eight-hour period (approximately four hours into the eight-hour period), a single data point was manipulated to determine at what instantaneous temperature change would induce an alarm. Thus, for the data point, the temperature was increased, the real-time value, the mid-term average, the long-term average, the combined average, and the upper and lower setpoints were re-calculated using the manipulated data point. At about 12.5° F. of instantaneous temperature change (e.g., adding 12.5° F. to the data point) resulted in the data point being outside of the setpoints.

Figure 18:
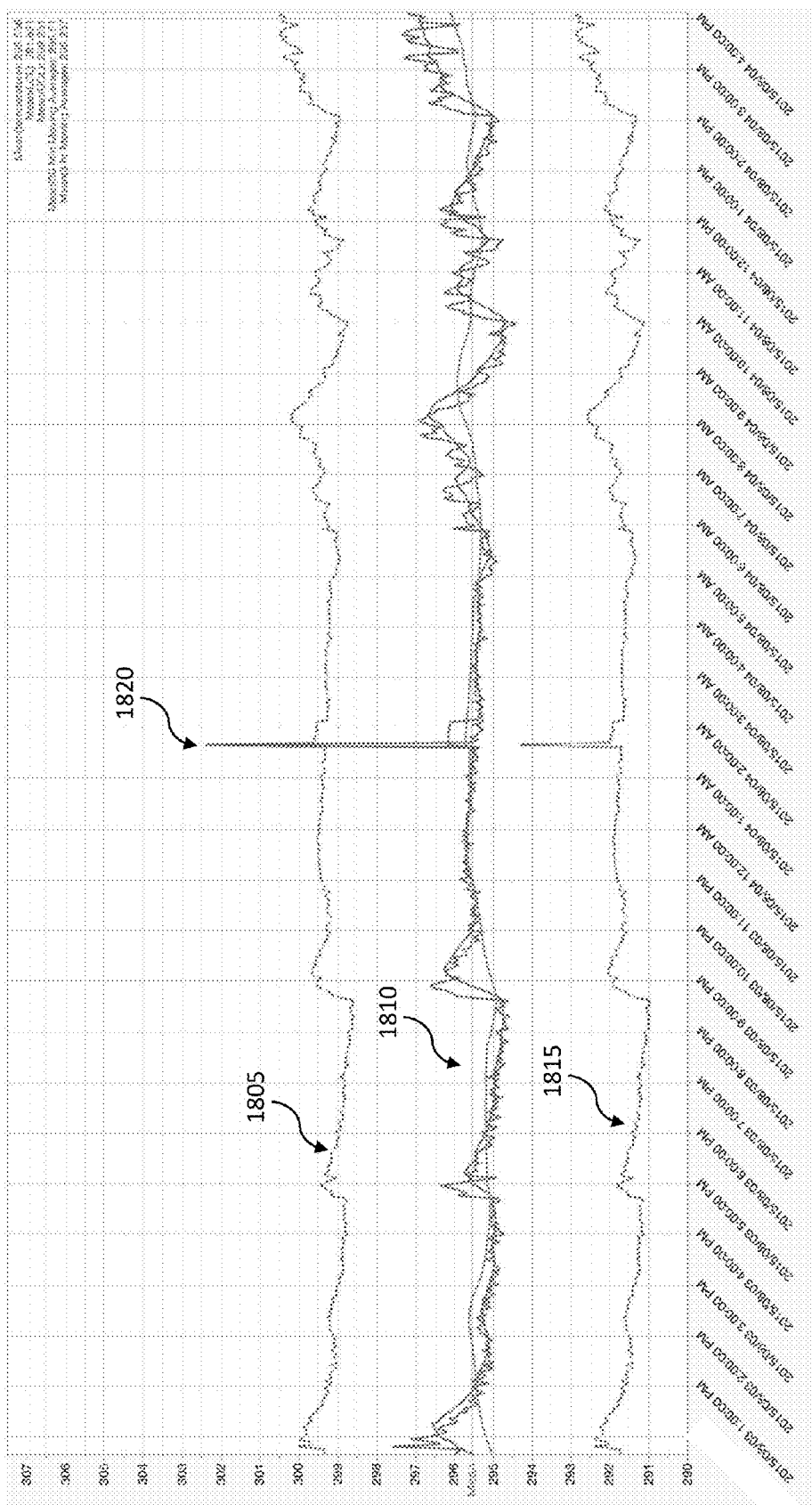
FIGS. 18-21 are plots that illustrate Examples 1-4 in accordance with illustrative embodiments.

FIG. 18 illustrates the experiment of Example 1. The x-axis is of time, and the y-axis is of temperature in Kelvin. Line 1805 plots the calculated upper setpoint, lines 1810 plot the real-time value (i.e., the instantaneous temperature), the mid-term average, and the long-term average, and line 1815 plots the lower setpoint. At point 1820, the data was manipulated such that the instantaneous temperature exceeded the upper setpoint.

Example 2

Data was collected from a temperature sensor for several weeks. For each new data point received after a month, a real-time value, a mid-term average, and a long-term average of the data was calculated. The real-time value was the instantaneous value every three minutes, the mid-term average was the average temperature for the previous thirty minutes, and the long-term average was the average temperature for the previous three hours. A combined average was determined for each data point by averaging the real-time value, the mid-term average, and the long-term average. A period of eight hours was chosen for the example. The temperature during the eight-hour period was relatively stable, and the real-time value, the mid-term average, and the long-term average were all about the same value of about 72° F. A stable and consistent eight-hour period was chosen because a manipulation of the data would show the effect of the manipulation without alternative causes of the effect. The standard deviation of the combined averages for the previous thirty days was about 1.27° F. The upper setpoint was set to three standard deviations above the combined average, and the lower setpoint was set to three standard deviations below the combined average.

At a mid-point during the eight-hour period (approximately four hours into the eight-hour period), the data point was manipulated to determine how much time passes before an alarm is set off at a temperature rate of change of 2 K per three minutes. Thus, for the data, the temperature was increased starting at a mid-point of the eight-hour period, the real-time value, the mid-term average, the long-term average, the combined average, and the upper and lower setpoints were re-calculated using the manipulated data for each data point. After nine minutes (i.e., a change of 8 K), the first manipulated data point was outside of the setpoint limits set for that data point.

Figure 19:
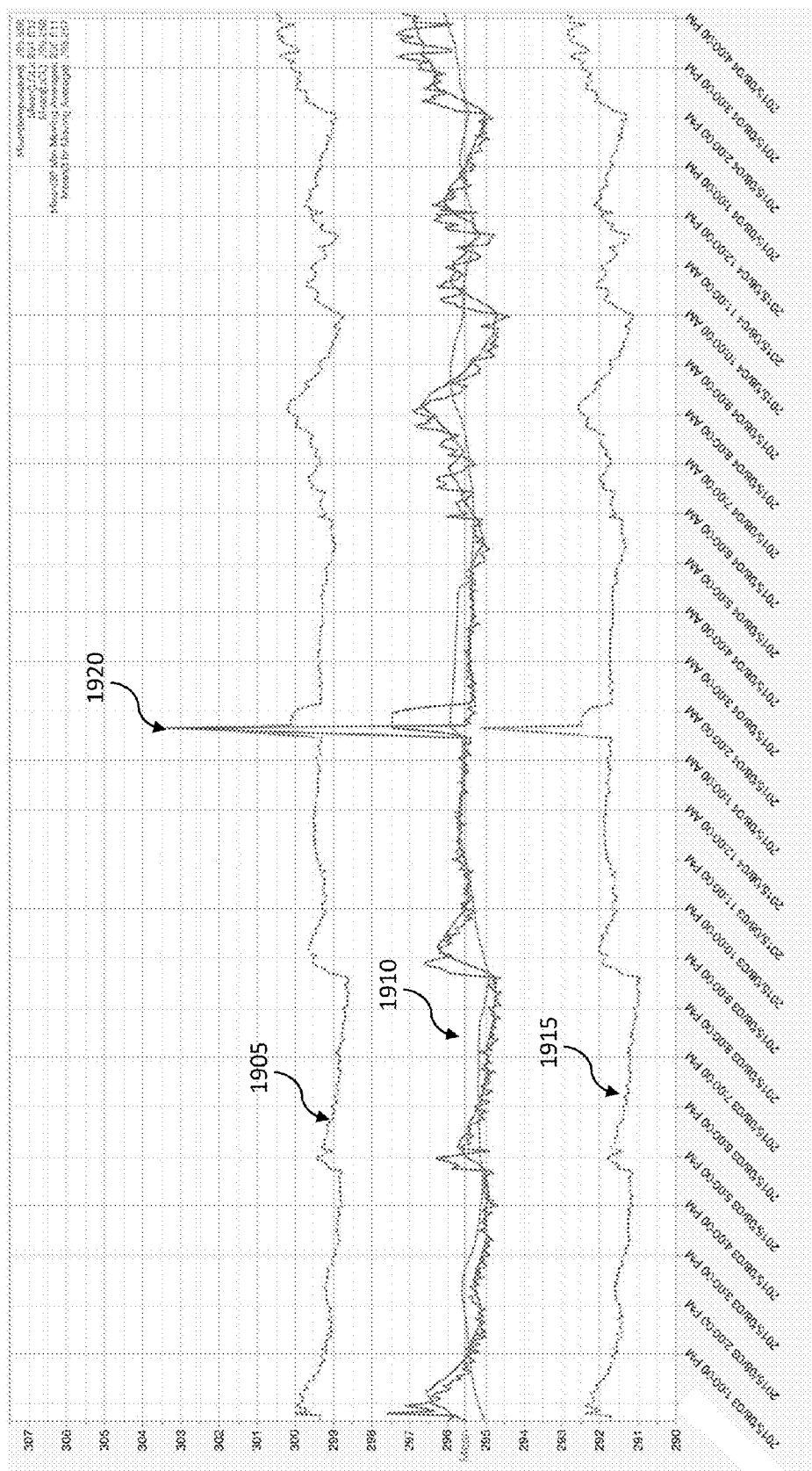

FIG. 19 illustrates the experiment of Example 2. The x-axis is of time, and the y-axis is of temperature in Kelvin. Line 1905 plots the calculated upper setpoint, lines 1910 plot the real-time value (i.e., the instantaneous temperature), the mid-term average, and the long-term average, and line 1915 plots the lower setpoint. At point 1920, the data was manipulated such that the instantaneous temperature exceeded the upper setpoint.

Example 3

Data was collected from a temperature sensor for several weeks. For each new data point received after a month, a real-time value, a mid-term average, and a long-term average of the data was calculated. The real-time value was the instantaneous value every three minutes, the mid-term average was the average temperature for the previous thirty minutes, and the long-term average was the average temperature for the previous three hours. A combined average was determined for each data point by averaging the real-time value, the mid-term average, and the long-term average. A period of eight hours was chosen for the example. The temperature during the eight-hour period was relatively stable, and the real-time value, the mid-term average, and the long-term average were all about the same value of about 72° F. A stable and consistent eight-hour period was chosen because a manipulation of the data would show the effect of the manipulation without alternative causes of the effect. The standard deviation of the combined averages for the previous thirty days was about 1.27° F. The upper setpoint was set to three standard deviations above the combined average, and the lower setpoint was set to three standard deviations below the combined.

At a mid-point during the eight-hour period (approximately four hours into the eight-hour period), the data point was manipulated to determine how much time passes before an alarm is set off at a temperature rate of change of 1 K per three minutes. Thus, for the data, the temperature was increased starting at a mid-point of the eight-hour period, the real-time value, the mid-term average, the long-term average, the combined average, and the upper and lower setpoints were re-calculated using the manipulated data for each data point. After twenty-one minutes (i.e., a change of 8 K), the first manipulated data point was outside of the setpoint limits set for that data point.

Figure 20:
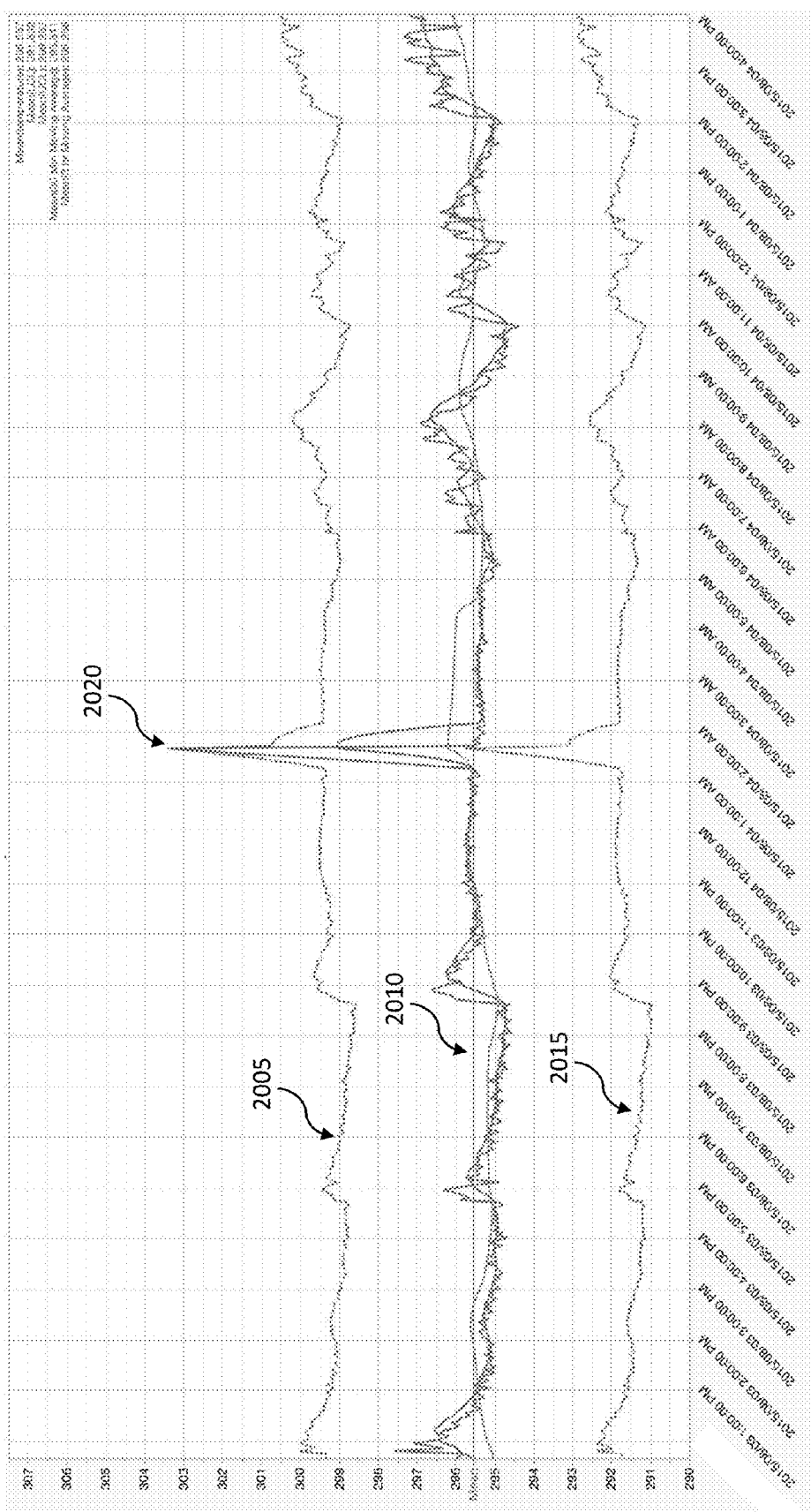

FIG. 20 illustrates the experiment of Example 2. The x-axis is of time, and the y-axis is of temperature in Kelvin. Line 2005 plots the calculated upper setpoint, lines 2010 plot the real-time value (i.e., the instantaneous temperature), the mid-term average, and the long-term average, and line 2015 plots the lower setpoint. At point 2020, the data was manipulated such that the instantaneous temperature exceeded the upper setpoint.

Example 4

Data was collected from a temperature sensor for several weeks. For each new data point received after a month, a real-time value, a mid-term average, and a long-term average of the data was calculated. The real-time value was the instantaneous value every three minutes, the mid-term average was the average temperature for the previous thirty minutes, and the long-term average was the average temperature for the previous three hours. A combined average was determined for each data point by averaging the real-time value, the mid-term average, and the long-term average. A period of eight hours was chosen for the example. The temperature during the eight-hour period was relatively stable, and the real-time value, the mid-term average, and the long-term average were all about the same value of about 72° F. A stable and consistent eight-hour period was chosen because a manipulation of the data would show the effect of the manipulation without alternative causes of the effect. The standard deviation of the combined averages for the previous thirty days was about 1.27° F. The upper setpoint was set to three standard deviations above the combined average, and the lower setpoint was set to three standard deviations below the combined average.

At a mid-point during the eight-hour period (approximately four hours into the eight-hour period), the data point was manipulated to determine how much time passes before an alarm is set off at a temperature rate of change of 0.5 K per three minutes. Thus, for the data, the temperature was increased starting at a mid-point of the eight-hour period, the real-time value, the mid-term average, the long-term average, the combined average, and the upper and lower setpoints were re-calculated using the manipulated data for each data point. After sixty-nine minutes (i.e., a change of 12 K), the first manipulated data point was outside of the setpoint limits set for that data point.

Figure 21:
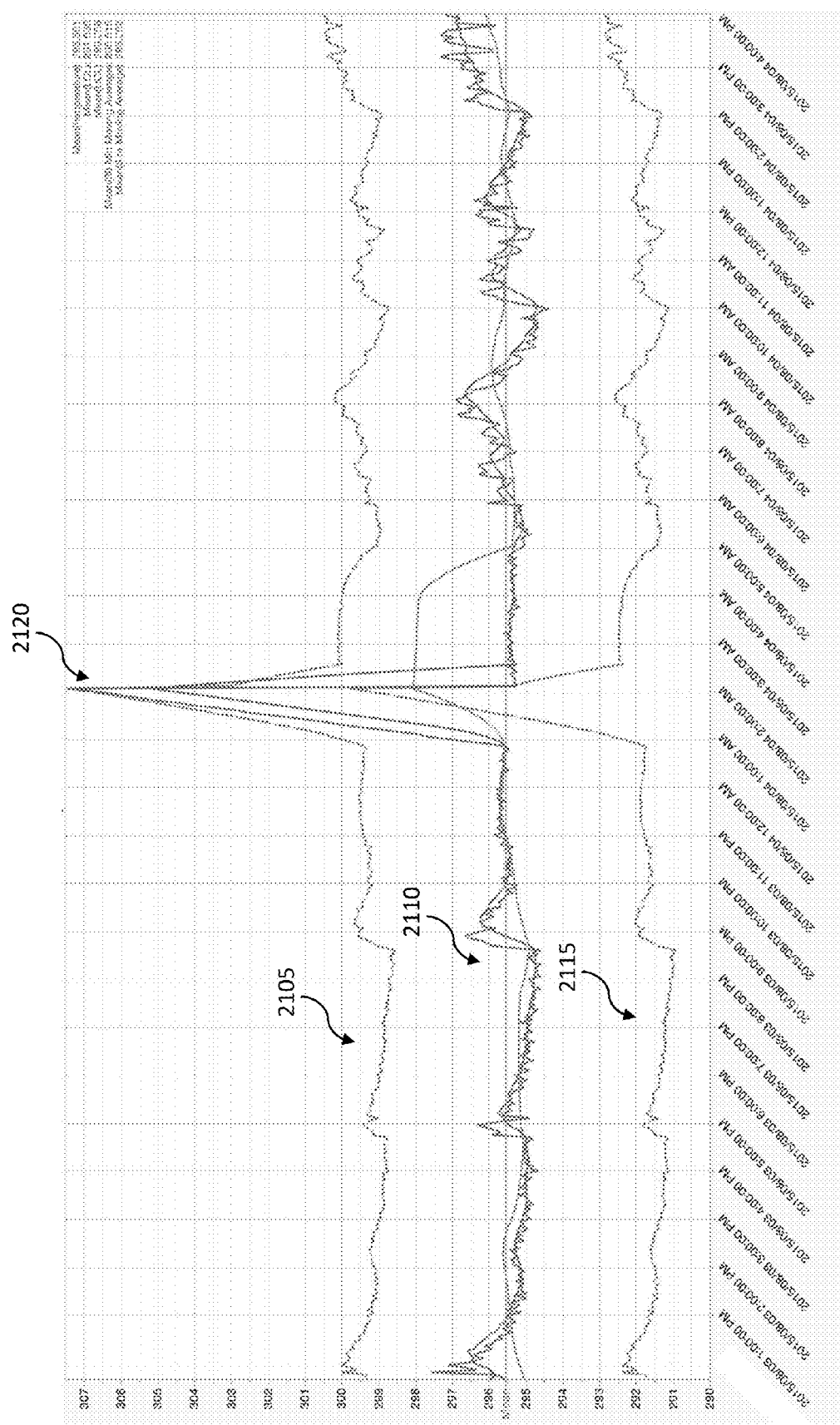

FIG. 21 illustrates the experiment of Example 2. The x-axis is of time, and the y-axis is of temperature in Kelvin. Line 2105 plots the calculated upper setpoint, lines 2110 plot the real-time values (i.e., the instantaneous temperature), the mid-term average, and the long-term average, and line 2115 plots the lower setpoint. At point 2120, the data was manipulated such that the instantaneous temperature exceeded the upper setpoint.

Examples 1-4 show that embodiments of the method 500 are robust. When there is a relatively quick change in the data, the change is detected by the method 500 quickly. A relatively slow and gradual change in the data does not result in an immediate alarm, but if the data continues to climb or drop to relatively extreme values, the method 500 will result in an alarm.

In an illustrative embodiment, any of the operations described herein can be implemented at least in part as computer-readable instructions stored on a computer-readable memory. Upon execution of the computer-readable instructions by a processor, the computer-readable instructions can cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
receiving data from a sensor over time at a remote computing device that is in communication with the sensor, wherein the data comprises a plurality of values that are each indicative of a sensed condition at a unique time, and wherein the sensed condition is one of a temperature, an amount of smoke obscuration, or an amount of a gas in the atmosphere;
determining, by the remote computing device, a real-time value, a mid-term moving average, and a long-term moving average based on the data;
determining, by the remote computing device, a most-recent combined average by averaging the real-time value, the mid-term moving average, and the long-term moving average;
determining, by the remote computing device, an upper setpoint by adding an offset value to the most-recent combined average;
determining, by the remote computing device, a lower setpoint by subtracting the offset value to the most-recent combined average;
transmitting, by the remote computing device, an instruction to the sensor to generate an alert based on a determination that a most recent value of the data is either greater than the upper setpoint or lower than the lower setpoint; and
generating, by the sensor and in response to the instruction, the alert to warn of a possible emergency condition in a structure in which the sensor is located.

2. The method of claim 1, wherein the real-time value is an arithmetic mean of values of the data of the previous three minutes.

3. The method of claim 1, wherein the mid-term moving average is an arithmetic mean of values of the data of the previous thirty minutes.

4. The method of claim 1, wherein the long-term moving average is an arithmetic mean of values of the data of the previous three hours.

5. The method of claim 1, further comprising:
determining a plurality of combined averages; and
determining a standard deviation of the plurality of the combined averages,
wherein the offset value is a multiple of the standard deviation of the plurality of the combined averages.

6. The method of claim 5, further comprising:
determining a goodness-of-fit value of the plurality of combined averages to a model distribution; and
determining the offset value by multiplying the standard deviation by a multiple of the goodness-of-fit value.

7. The method of claim 6, wherein the model distribution is a normal distribution.

8. The method of claim 6, wherein said determining the goodness-of-fit value comprises using a Shapiro-Wilk goodness-of-fit test function or a Kolmogorov-Smirnov goodness of fit test function.

9. The method of claim 1, wherein the sensor is located in a room, and wherein said transmitting the alert causes an alarm to sound and notify occupants of the room.

10. The method of claim 1, wherein said transmitting the alert is further based on a determination that a current risk level is greater than a predetermined risk threshold, wherein determining the current risk includes using a Bayesian Network of a plurality of risk nodes, and wherein one of the plurality of risk nodes comprises the most-recent combined average.

11. A system comprising:
a sensor configured to sense data that can indicate in an emergency condition in a structure; and
a remote computing device in communication with the sensor, wherein the remote computing device comprises
a transceiver configured to receive the data received from the sensor over time;
a memory configured to store the data, wherein the data comprises a plurality of values that are each indicative of a sensed condition at a unique time, and wherein the sensed condition is one of a temperature, an amount of smoke obscuration, or an amount of a gas in the atmosphere; and
a processor operatively coupled to the memory and the transceiver, and configured to:
determine a real-time value, a mid-term moving average, and a long-term moving average based on the data;
determine a most-recent combined average by averaging the real-time value, the mid-term moving average, and the long-term moving average;
determine an upper setpoint by adding an offset value to the most-recent combined average;
determine a lower setpoint by subtracting the offset value to the most-recent combined average; and
transmit an instruction to the sensor to generate an alert based on a determination that a most recent value of the data is either greater than the upper setpoint or lower than the lower setpoint;
wherein the sensor is configured to generate, responsive to the instruction, the alert to warn of the emergency condition in the structure in which the sensor is located.

12. The device of claim 11, wherein the real-time value is an arithmetic mean of values of the data of the previous three minutes, the mid-term moving average is an arithmetic mean of values of the data of the previous thirty minutes, and the long-term moving average is an arithmetic mean of values of the data of the previous three hours.

13. The device of claim 11, wherein the processor is further configure to:
determine a plurality of combined averages; and
determine a standard deviation of the plurality of the combined averages,
wherein the offset value is a multiple of the standard deviation of the plurality of the combined averages.

14. The device of claim 13, wherein the processor is further configured to:
determine a goodness-of-fit value of the plurality of combined averages to a model distribution; and
determine the offset value by multiplying the standard deviation by a multiple of the goodness-of-fit value.

15. The device of claim 14, wherein the model distribution is a normal distribution.

16. The device of claim 14, wherein to determine the goodness-of-fit value, the processor is configured to use a Shapiro-Wilk goodness-of-fit test function or a Kolmogorov-Smirnov goodness of fit test function.

17. The device of claim 11, wherein the sensor is located in a room, and wherein to transmit the alert, the processor is configured to cause an alarm to sound and notify occupants of the room.

18. A non-transitory computer-readable medium having computer-readable instructions stored thereon that, upon execution by a processor, cause a remote computing device to perform operations, wherein the instructions comprise:

instructions to receive, by the remote computing device, data from a sensor over time, wherein the remote computing device and the sensor are in communication with one another, and wherein the data comprises a plurality of values that are each indicative of a sensed condition at a unique time, and wherein the sensed condition is one of a temperature, an amount of smoke obscuration, or an amount of a gas in the atmosphere;

instructions to determine, by the remote computing device, a real-time value, a mid-term moving average, and a long-term moving average based on the data;

instructions to determine, by the remote computing device, a most-recent combined average by averaging the real-time value, the mid-term moving average, and the long-term moving average;

instructions to determine, by the remote computing device, an upper setpoint by adding an offset value to the most-recent combined average;

instructions to determine, by the remote computing device, a lower setpoint by subtracting the offset value to the most-recent combined average; and instructions to transmit, by the remote computing device, an instruction to the sensor to generate an alert to warn of a possible emergency condition in a structure in which the sensor is located, wherein the instruction is transmitted responsive to a determination that a most recent value of the data is either greater than the upper setpoint or lower than the lower setpoint.

\* \* \* \* \*